United States Patent
Ashari et al.

(10) Patent No.: US 12,452,745 B2
(45) Date of Patent: Oct. 21, 2025

(54) COOPERATION-ENABLED ACCESS IN INTEGRATED WIRELESS COMMUNICATION NETWORKS

(71) Applicant: HUAWEI TECHNOLOGIES CO., LTD., Guangdong (CN)

(72) Inventors: Jalal Khamse Ashari, Kanata (CA); Amine Maaref, Kanata (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 232 days.

(21) Appl. No.: 18/322,691

(22) Filed: May 24, 2023

(65) Prior Publication Data

US 2023/0300692 A1   Sep. 21, 2023

Related U.S. Application Data

(63) Continuation of application No. PCT/CN2020/133022, filed on Dec. 1, 2020.

(51) Int. Cl.
*H04W 36/00* (2009.01)
*H04L 5/14* (2006.01)

(52) U.S. Cl.
CPC ........... *H04W 36/0069* (2018.08); *H04L 5/14* (2013.01)

(58) Field of Classification Search
CPC .............................. H04W 36/0069; H04L 5/14
See application file for complete search history.

(56) References Cited

U.S. PATENT DOCUMENTS 11,601,906 B2 * 3/2023 Sengupta ............... H04B 7/185
11,729,736 B2 * 8/2023 Farag ................ H04W 74/0841
370/503

(Continued)

FOREIGN PATENT DOCUMENTS

WO   2019240770 A1   12/2019
WO   2021080270 A1    4/2021

OTHER PUBLICATIONS

"Study on New Radio (NR) to support non-terrestrial networks"; 3rd Generation Partnership Project; Technical Specification Group Radio Access Network; Release 15; 3GPP TR 38.811; V15.2.0; Sep. 2019; 126 pages.

(Continued)

*Primary Examiner* — Bailor C Hsu
(74) *Attorney, Agent, or Firm* — Slater Matsil, LLP

(57) ABSTRACT

In an integrated wireless communication network that includes terrestrial and non-terrestrial network devices, signaling that is indicative of information for application by a User Equipment (UE) in selection between multiple cooperation nodes to provide the UE with access to a non-terrestrial network device in the integrated wireless communication network is communicated. Cooperation may also or instead be applied in conjunction with a group handover procedure. For example, signaling that is indicative of information for application in making a handover determination by a cooperation node may be communicated. The handover determination may involve determining whether a first cooperation node is to perform a handover procedure to establish a connection to a second network device while a second cooperation node maintains its connection to a first network device; or the second cooperation node is to perform the handover procedure while the first (Continued)

cooperation node maintains its connection to the first network device.

20 Claims, 14 Drawing Sheets

(56) References Cited

U.S. PATENT DOCUMENTS

| | | | |
|---|---|---|---|
| 11,929,803 B2* | 3/2024 | Sengupta | H04B 7/088 |
| 2014/0085142 A1* | 3/2014 | Baruch | G01S 19/25 |
| | | | 342/357.64 |
| 2016/0323800 A1* | 11/2016 | Ulupinar | H04B 7/1851 |
| 2020/0313755 A1* | 10/2020 | Chuang | H04L 5/0048 |
| 2021/0194571 A1* | 6/2021 | Ma | H04B 7/18504 |
| 2022/0124796 A1* | 4/2022 | Salem | H04L 5/0051 |
| 2022/0278785 A1* | 9/2022 | Liberg | G16Y 30/00 |
| 2023/0061890 A1* | 3/2023 | Cui | H04L 5/0051 |
| 2024/0306112 A1* | 9/2024 | Bao | H04W 64/00 |

OTHER PUBLICATIONS

Thales. "NTN inputs to RAN3 study conclusion". 3GPP TSG RAN WG3 Meeting #104. R3-192763. Reno, May 13-17, 2019. 13 pages.
LG Electronics Inc., "Dual connectivity use cases in NTN". 3GPP TSG-RAN WG2 Meeting #106. R2-1907897. Reno, U.S.A., May 13-May 17, 2019. 3 pages.

* cited by examiner

500

Network Assisted Approach

The network may impose some constraints/preferences on UE connections/capabilities to serve as a potential CN
502

↓

The network specifies the anchor point and possibly the cell ID(s) and cooperation mode for a particular location or TUE
504

↓

The potential CNs signal their capabilities and other network assistance information to the TUE(s)
506

↓

The TUE may choose a cooperation group or switch between potential CNs, based on their capabilities and/or access link quality
508

FIG. 5

COOPERATION-ENABLED ACCESS IN INTEGRATED WIRELESS COMMUNICATION NETWORKS

CROSS-REFERENCE TO RELATED APPLICATIONS

This application is a continuation of International Application No. PCT/CN2020/133022, filed on Dec. 1, 2020, which is hereby incorporated by reference in its entirety.

FIELD

This application relates generally to communications, and in particular to providing cooperation-enabled access to an integrated wireless communication.

BACKGROUND

UE cooperation has been proposed as a means to create a virtual UE with multiple transceiver antennas distributed across different UEs. A virtual UE can potentially enhance the achievable throughput, bandwidth efficiency, and coverage range for each UE. UEs may also communicate with each other, for example over a sidelink interface and possibly on a second spectrum or unlicensed band, to help eliminate co-channel interference of an access link from the same base station or different base stations.

Integrated Access and Backhaul (IAB) is another related technology which helps to extend coverage by providing network access, possibly over a multi-hop connection. In IAB, a cooperating node (CN) operates as a user terminal on its backhaul connection, and also implements functionality to provide access to connected UEs.

Virtual UEs with relaying over direct communication links such as sidelinks, and IAB deployments with CNs operating as user terminals, are both examples of cooperation. Such features or functions as establishing a connection and mobility management are usually controlled by the network and managed by network devices such as base stations. For example, in many conventional solutions for cooperation, it is assumed that CNs and each Target UE (TUE) that is to be assisted are within a coverage area of an Access Point or Anchor Point (AP). The AP helps determine a set of CNs for each TUE, and the AP is also involved in higher layer functions such as UE-TRP (Transmit-Receive Point) association, mobility management, and positioning.

In a network of integrated terrestrial and non-terrestrial components, UEs may have various capabilities, in terms of multi-connectivity, antenna configuration, and position-awareness, for example. Cooperation may be especially useful in such an environment to enhance network coverage for UEs with limited capabilities relative to other UEs. For example, a UE that does not itself have satellite access in an out of coverage region may be provided with access through a satellite-connected UE or other CN. To exploit cooperation in such an environment, however, there are certain challenges.

One of the main challenges in this environment is the long propagation delay between UEs and satellites, such as Low-Earth Orbit (LEO) or geo-stationary satellites. A long propagation delay can potentially result in issues such as interrupted access or failure in a connection. A network device located at a ground station, for example, might not have an accurate estimate of a channel between cooperating nodes and TUEs. This situation could worsen when a TUE is moving, on board a vehicle for example. With much shorter range links between a TUE and CNs, the TUE may move outside the range of CN coverage for direct communications with a CN before the network device makes a decision to switch the TUE to another CN.

Another issue is that different nodes may have various capabilities in an environment of an integrated terrestrial and non-terrestrial network. For example, some UEs may communicate only through a terrestrial network subsystem, whereas other UEs may also connect to other subsystems such as a satellite subsystem. Moreover, different CNs in such an environment may be connected through different paths with different characteristics. For example, because of different coverage ranges for different subsystems in an integrated terrestrial and non-terrestrial NTN, CNs in the same region might be connected through different anchor points. The connection paths may also differ in terms of number of hops and/or delay to the anchor point.

Conventional network-based UE cooperation control and management may be feasible in fixed network deployments with terrestrial and non-mobile network devices, for example, but may prove challenging in integrated networks with terrestrial and non-terrestrial network devices. Although it may be desirable to avoid issues associated with propagation delay in integrated networks, access points or other network devices tend to be best suited to controlling and managing cooperation. For example, relative to other devices or components in a network, network devices may have better access to information based upon which cooperation decisions such as CN selections can be made.

Handover latency in satellite networks can also be a challenge, at least in terms of relatively long delay to complete a handover and connection interruption during handover. In a handover scenario, multi-connection capability may be useful to reduce the likelihood of interruption, or potentially avoid interruption, during a time period in which a satellite connected UE undergoes a relatively long procedure to execute a non-terrestrial handover. Not all UEs, however, have the capability to maintain multiple network connections at one time.

SUMMARY

Some embodiments of the present disclosure exploit self-organized cooperation in an integrated terrestrial and non-terrestrial communication network and in the presence of CNs such as UEs with different capabilities. Cooperation may involve single-hop or multiple hop connections. UEs with limited capabilities, which are not able to directly connect to non-terrestrial network devices such as satellites for example, may be assisted and provided with integrated network access through satellite-connected CNs in a self-organized fashion.

The present disclosure also encompasses embodiments related to handover in non-terrestrial or integrated networks, by exploiting multi-connectivity through cooperation-enabled group handover.

Disclosed embodiments include a method performed by a UE in an integrated wireless communication network that includes terrestrial and non-terrestrial network devices. Such a method may involve receiving signaling that is indicative of information for application by the UE in selection between multiple cooperation nodes to provide the UE with access to a non-terrestrial network device in the integrated wireless communication network, and selecting between the multiple cooperation nodes based on the information.

According to another aspect of the present disclosure, a UE includes a communication interface; a processor, coupled to the communication interface; and a non-transitory computer readable storage medium, coupled to the processor, storing programming for execution by the processor. The programming includes instructions to, or to cause the processor to, receive such signaling. The signaling is indicative of information for application by the UE in selection between multiple cooperation nodes to provide the UE with access to a non-terrestrial network device in the integrated wireless communication network. The programming also includes instructions to, or to cause the processor to, select between the multiple cooperation nodes based on the information.

A computer program product is also disclosed, and includes a non-transitory computer readable storage medium storing programming. The programming includes instructions to, or to cause a processor to: receive, by a UE, such signaling that, as in other embodiments, is indicative of information for application by a UE in selection between multiple cooperation nodes to provide the UE with access to a non-terrestrial network device in the integrated wireless communication network; and select between the multiple cooperation nodes based on the information.

Another aspect of the present disclosure relates to a method performed by a cooperation node in an integrated wireless communication network that includes terrestrial and non-terrestrial network devices. Such a method may involve transmitting signaling to a UE. The signaling is indicative of information for application by the UE in selection between multiple cooperation nodes, including the cooperation node, to provide the UE with access to a non-terrestrial network device in the integrated wireless communication network.

According to another embodiment, a cooperation node for an integrated wireless communication network includes a communication interface; a processor, coupled to the communication interface; and a non-transitory computer readable storage medium, coupled to the processor, storing programming for execution by the processor. A computer program product is also contemplated, and includes a non-transitory computer readable storage medium storing programming. In apparatus embodiments and computer program product embodiments, the programming includes instructions to transmit signaling to a UE. The signaling is indicative of information for application by the UE in selection between multiple cooperation nodes, including the cooperation node, to provide the UE with access to a non-terrestrial network device in the integrated wireless communication network.

Other aspects and features of embodiments of the present disclosure will become apparent to those ordinarily skilled in the art upon review of the following description.

BRIEF DESCRIPTION OF THE DRAWINGS

For a more complete understanding of the present embodiments, and the advantages thereof, reference is now made, by way of example, to the following descriptions taken in conjunction with the accompanying drawings, in which:

FIG. 5 is a flow diagram illustrating a network assisted approach according to another embodiment;

DETAILED DESCRIPTION

For illustrative purposes, specific example embodiments will now be explained in greater detail below in conjunction with the figures.

The embodiments set forth herein represent information sufficient to practice the claimed subject matter and illustrate ways of practicing such subject matter. Upon reading the following description in light of the accompanying figures, those of skill in the art will understand the concepts of the claimed subject matter and will recognize applications of these concepts not particularly addressed herein. It should be understood that these concepts and applications fall within the scope of the disclosure and the accompanying claims.

The present disclosure relates, in part, to integrated wireless communication networks that integrate terrestrial and non-terrestrial network devices or systems. Such integration may exploit non-terrestrial network devices to enhance wireless communications that might otherwise be available in a fully terrestrial communication network. Non-terrestrial communication systems include network devices that are not ground-based, and can be used, for example, to provide wireless access to areas that are difficult to service or prohibitively expensive for the number of users that may be served at any given time using terrestrial communication systems, or possibly to provide temporary additional capacity for terrestrial communication systems for a period of time.

Figure 1:
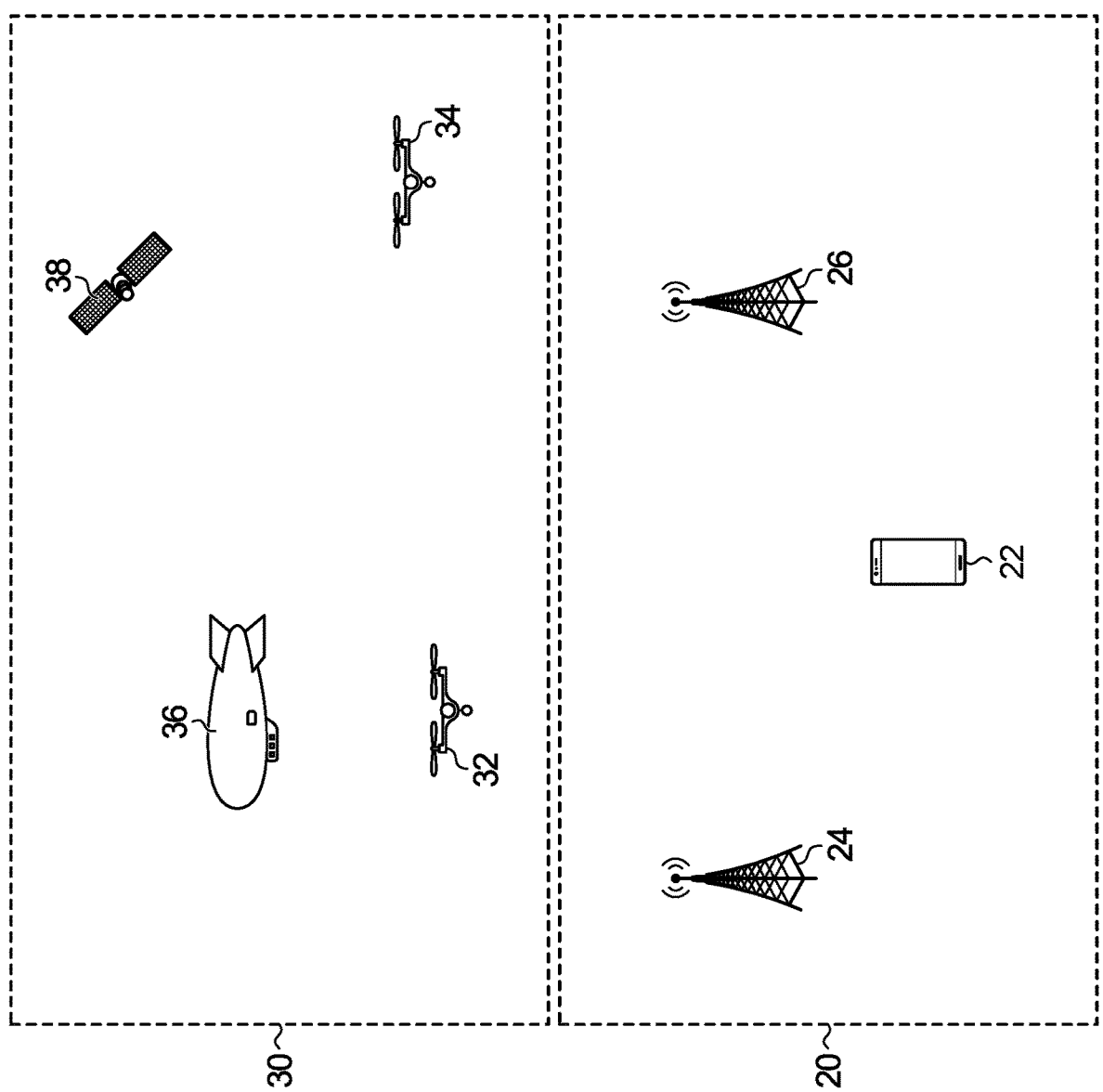
FIG. 1 is a block diagram illustrating an example communication network that integrates terrestrial and non-terrestrial network devices.

FIG. 1 is a block diagram illustrating an example communication network that integrates terrestrial and non-terrestrial network devices. The example communication network 10 includes both a terrestrial communication network or system 20 and a non-terrestrial communication network or system 30. The terrestrial communication network 20 and the non-terrestrial communication network 30 could be considered sub-networks or sub-systems of the communication network 10. As shown, the terrestrial communication network 20 includes multiple terrestrial network devices 24, 26, and the non-terrestrial communication network 30 includes multiple non-terrestrial network devices 32, 34, 36, 38.

Examples of a terrestrial network device 24, 26 include TRPs, base stations, and other types of network nodes that are ground-based. A terrestrial network device is bound to the ground. For example, a terrestrial network device may be mounted on or in a building or tower. A terrestrial communication network or terrestrial network device may also be referred to as a land-based or ground-based, and can also or instead include networks or devices that are implemented on or in water.

Non-terrestrial network devices such as those shown at 32, 34, 36, 38 may also include TRPs or other types of network nodes, and may be similar to terrestrial network devices in structure and function but with the exception that non-terrestrial network devices are not ground-based. Examples of non-terrestrial network devices include network devices that are carried by or otherwise implemented in drones as shown at 32, 34, High Altitude Platforms (HAPs) as shown by way of example at 36, and satellites as shown at 38. Other examples of non-terrestrial network devices are possible but are not shown in FIG. 1, such as network devices that are carried by or otherwise implemented in balloons, planes, or other aircraft.

Terrestrial network devices may be referred to or described by way of example as terrestrial TRPs or T-TRPs, and similarly non-terrestrial network devices may be referred to or described by way of example as non-terrestrial TRPs or NT-TRPs. Features disclosed herein in the context of a T-TRP or an NT-TRP are also applicable more generally to other types of terrestrial and non-terrestrial network devices, respectively.

FIG. 1 also illustrates a UE 22. Although the UE 22 is a terrestrial UE in the terrestrial communication network 20 in the example shown, this is intended to be a non-limiting example. An integrated communication network may also or instead provide communication services to non-terrestrial UEs. It should also be noted that although only a single UE is shown at 22 in FIG. 1, as illustrated in other drawings multiple UEs may be involved in cooperation embodiments.

Figure 2:
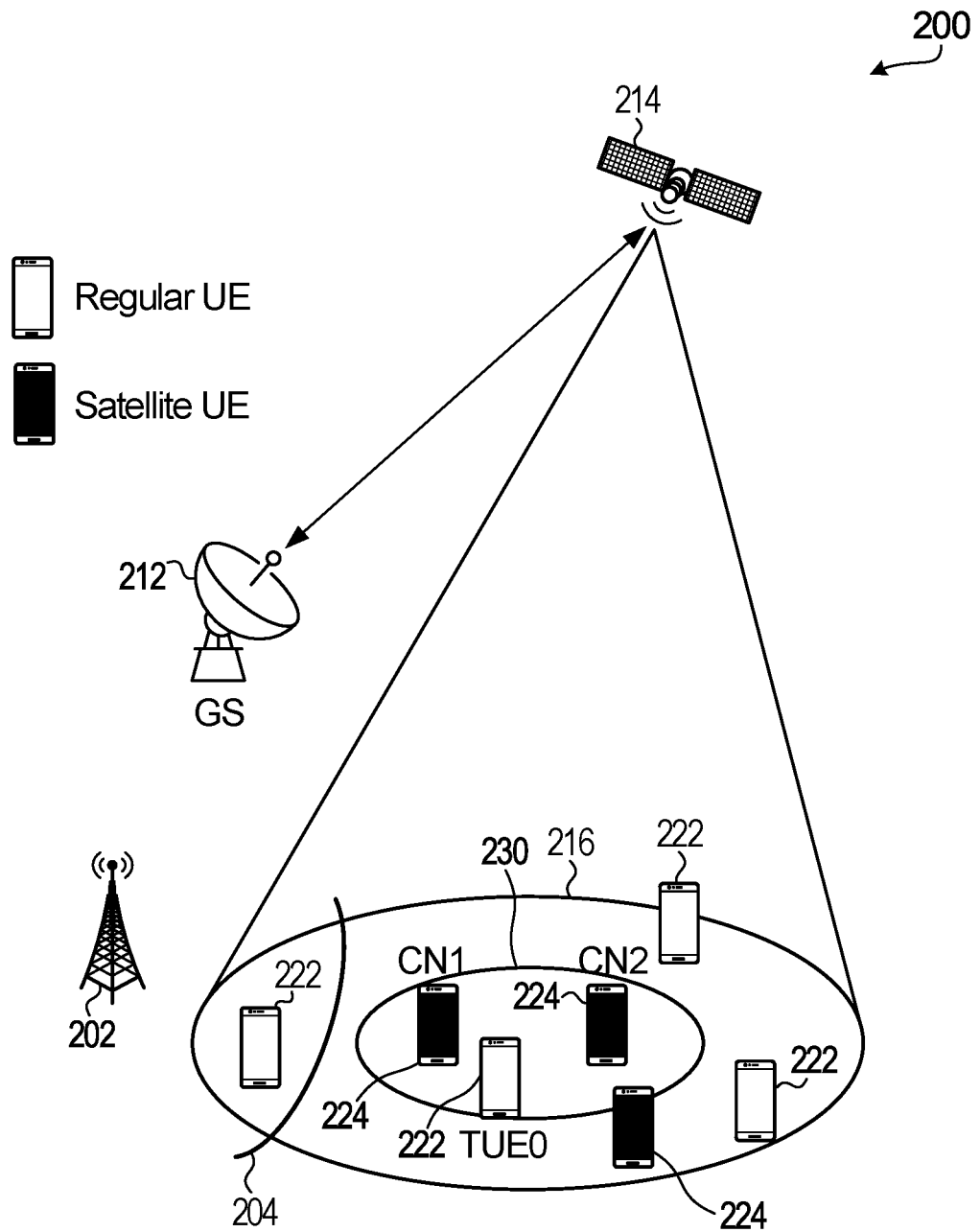
FIG. 2 is a block diagram illustrating another example integrated communication network.

FIG. 2 is a block diagram illustrating another example integrated communication network 200, which includes a base station 202 with a coverage area outlined in part at 204, a ground station (GS) 212 that operates with a satellite 214 to provide a coverage area outlined at 216, "regular" UEs 222, and "satellite" UEs 224. Regular UEs 222 represent UEs that do not have satellite connection capability, and satellite UEs 224 are able to connect to the ground station 212 via the satellite 214. In FIG. 2, 230 indicates a cooperation group that will be used as an example to illustrate cooperation providing seamless integrated access to a UE that is outside the terrestrial network coverage area 204 of the base station 202. In this example the cooperation group includes multiple UEs. More generally, a cooperation group includes one or more cooperation nodes, also referred to herein as CNs, which may but need not necessarily be UEs.

Example implementations of the components shown in FIG. 2 are provided elsewhere herein.

In the example cooperation group 230, one of the regular UEs, labelled TUE0, is without direct satellite access and in an out of coverage region outside the coverage area 204 of the base station 202. Through the cooperation group 230, TUE0 may be provided seamless integrated network access, through two of the satellite connected UEs, CN1 and CN2.

As described above, long propagation delay between UEs and satellites can be a challenge in exploiting cooperation in an integrated communication network. Consider an implementation in which cooperation is managed by a network device at the ground station 212, by a so-called gNB central unit (CU) for example. Such a network device might not have an accurate estimate of the channels between TUE0, which may be moving, and each of CN1 and CN2, either or both of which may also or instead be moving. The TUE-CN links are of much shorter range than the CN-satellite-GS links, and therefore TUE0 may move out of the range of direct communications with CN1 and CN2 before the network device at the GS 212 makes a decision to switch TUE0 to another satellite UE 224, such as CN3.

An approach that is more self-organized by UEs or CNs or managed by UEs or CNs may be useful to exploit cooperation in an integrated terrestrial and non-terrestrial network. Embodiments disclosed herein enable UEs to autonomously and locally select or switch between local connections with CNs or decide on particular local connections with CNs from among several available options. Such local connections may be part of different paths across different subsystems.

Cooperation may also or instead be exploited to provide UEs with multi-connectivity, so as to reduce the likelihood of interruption, or potentially avoid interruption, during a time period in which a satellite connected UE undergoes a relatively long procedure to execute a non-terrestrial handover.

Embodiments related to self-organized or self-managed cooperation as disclosed herein may facilitate more effective and efficient mobility management in integrated communication networks.

UEs or CNs with different capabilities may also present a challenge in an environment of an integrated terrestrial and non-terrestrial network. Different UEs may have different capabilities which may impact their ability to connect to different subsystems, for example. With reference to FIG. 2, some UEs 222 may communicate only through a terrestrial network, and other UEs 224 may connect to other subsystems such as a satellite subsystem in the example shown. Among the satellite UEs 224, some may receive satellite signals in the downlink direction but not communicate with satellites in the uplink direction, whereas others may communicate with satellites in both directions. Multi-connection capability may also or instead be different for different UEs. Some UEs might be able to simultaneously send signals to and receive signals from multiple network devices such as multiple TRPs, whereas other UEs might communicate with only one TRP at a time when connected to multiple cells or subsystems. Other examples of capabilities that may differ between UEs or CNs include full-duplex connectivity, position awareness, antenna configuration, and supported frequencies. The present disclosure is not limited to any particular UE or CN capabilities, and other UE or CN capabilities that differ between UEs or CNs are possible. In general, capabilities may be taken into account in deciding to establish a connection through a CN, and given that different CNs may have different capabilities, it may be important to identify which CNs have potential for cooperation.

Moreover, different CNs such as CN1, CN2, CN3 may be connected to one or more non-terrestrial network devices through different paths with different characteristics. Due to different coverage ranges for different subsystems in an integrated terrestrial and non-terrestrial network, for example, even CNs in the same geographical region might be connected through different anchor points. Connection paths may also or instead differ in terms of other characteristics such as numbers of hops and/or delay to the anchor point(s).

In order to exploit cooperation in a self-organized fashion, a TUE such as TUE0 in FIG. 2 may be provided with information, such as network assistance information and CN capabilities as described elsewhere herein, to enable the TUE to decide between different CNs with different connections and capabilities.

Figure 3:
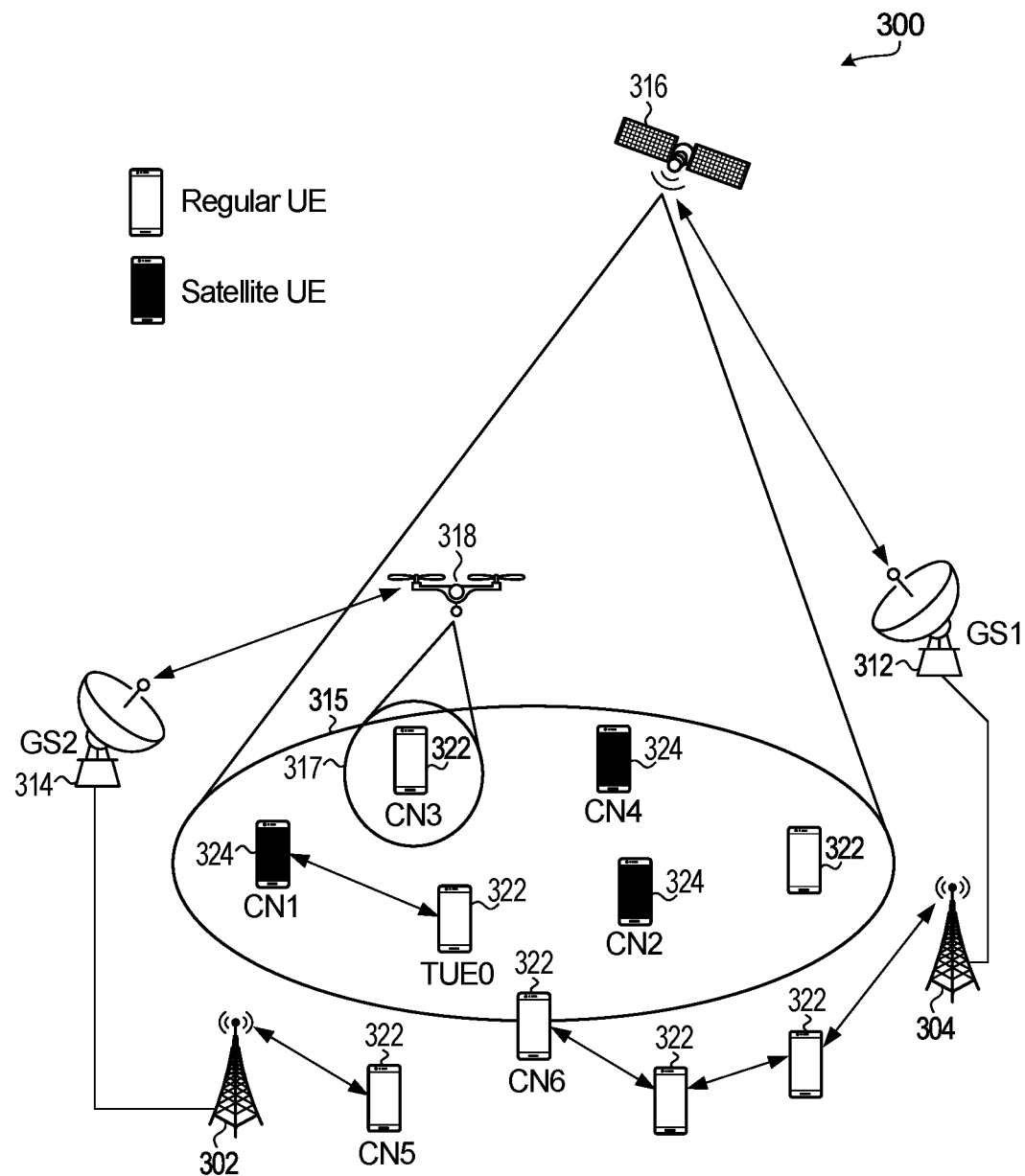
FIG. 3 is a block diagram illustrating a further example integrated communication system in which aspects of the present disclosure are implemented in some embodiments.

FIG. 3 is a block diagram illustrating a further example integrated communication network 300, which includes base stations 302, 304, ground stations 312, 314 that operate with a satellite 316 and a drone-based network device 318 to provide respective coverage areas outlined at 315, 317, regular UEs 322, and satellite UEs 324. As shown, different cooperating nodes in a certain region may have various network connections through different subsystems. For example, the network connections for CN1, CN2, and CN4 are established through the satellite 316, the connection for CN3 is established through an airborne device shown by way of example as the drone-based network device 318, and for CN5 and CN6 the connections are established through a terrestrial network and base stations 302, 304. The terrestrial connection for CN6 is a multi-hop connection in the example shown. Each of these connections has certain characteristics. For example, a satellite connection may have a relatively long propagation delay compared to other connections as described elsewhere herein, whereas a multi-hop connection through a terrestrial network may result in lower latency but might not be as reliable as a direct connection or other types of connection.

FIG. 3 also illustrates CNs in the same region connected through different anchor points. The connections for CN1, CN2, CN4 and CN6 are terminated at GS1, and the connections for CN3 and CN5 are terminated at GS2. This may impact cooperation mode. For example, to cooperate at the Medium Access Control (MAC) layer, different CNs should have connections terminated at the same gNB (or the same gNB-CU). CNs with connections terminating at different gNBs, however, may cooperate at higher layers, such as Packet Data Convergence Protocol (PDCP) layer or above.

In the context of the example integrated communication network 300 in FIG. 3, it may perhaps be more apparent than from FIG. 2 that exploiting cooperation in a self-organized fashion may involve providing TUEs such as TUE0 in FIG. 3 with network assistance information, such as one or more of the identity of anchor points, number of hops, and delay to the anchor point(s) for example, to enable a TUE to select between different cooperation nodes for integrated access.

A multi-tier solution involving network devices and UEs in some embodiments may enable self-organized cooperation in a network of integrated terrestrial and non-terrestrial components, over single-hop or multi-hop connections. Seamless integrated access may be provided for UEs that do not themselves have satellite access capability. Access to an integrated communication network is also referred to herein as integrated access.

In some embodiments, connections towards anchor points such as gNB-CUs are network-managed, and UEs are enabled to autonomously decide on local connections or path switching to the anchor points. In addition to configuring anchor points for connection, for a certain region or for a particular TUE for example, one or more network devices may provide certain network assistance information and/or configurations to a UE to identify nodes that have potential for cooperation to provide the UE with access to an integrated communication network. CN capabilities may also or instead be provided to a UE, by one or more network devices or by CNs.

Potential cooperating nodes may also or instead signal their capabilities, and/or other assistance information, to enable a TUE to decide on the best connection path(s) and possibly a best mode for cooperation. By monitoring local connections, a TUE is able to locally switch between CNs without the need for potentially delayed signaling over the satellite connections.

According to self-organized cooperation embodiments disclosed herein, CNs that have potential for cooperation can be identified by a TUE that is to be assisted. Embodiments that address how a TUE may select a cooperation group from a set of CNs with different connections and/or different capabilities are also disclosed. Selection or decision criteria may be based on, for example, one or more of: connection type such as single-hop versus multi-hop connection type; link quality for either or both of backhaul links and access links; cooperation mode, etc.

With reference to FIG. 3, consider a connection or path switching example in which TUE0 is initially connected to the satellite 316 through CN1, but it is moving away from CN1 and towards CN2 and CN4. TUE0 may locally switch from CN1 to CN2, CN4, or CN6 without a layer 3 (L3) handover, because CN2, CN4, and CN6 also have connections to GS1. CN2 may be preferred over CN4 because CN4 is located closer to the beam edge at 315. CN2 may also be preferred over CN6 even though the CN6 connection provides access through the terrestrial network, because the CN6 connection is a multi-hop connection. A common anchor point (GS1), CN location, and type of connection in this example are illustrative of criteria that may be used by a TUE in selecting between different cooperation nodes for integrated access.

Satellite-connected nodes in a boundary region near a beam edge may organize themselves into groups. Within these groups, nodes that have better satellite access quality, such as aerial nodes or those closer to a beam center, may serve as CNs in order to alleviate beam edge issues.

Different approaches for managing connections towards anchor points and identifying CNs that have potential for cooperation are proposed herein. Features that are described herein as network features may be implemented in or otherwise provided by one or more network devices such as a gNB, but may be described in the context of network features for ease of reference rather than referring to one or more network devices at every instance. Network features are not necessarily limited to any particular implementation or type of network device.

Figure 4:
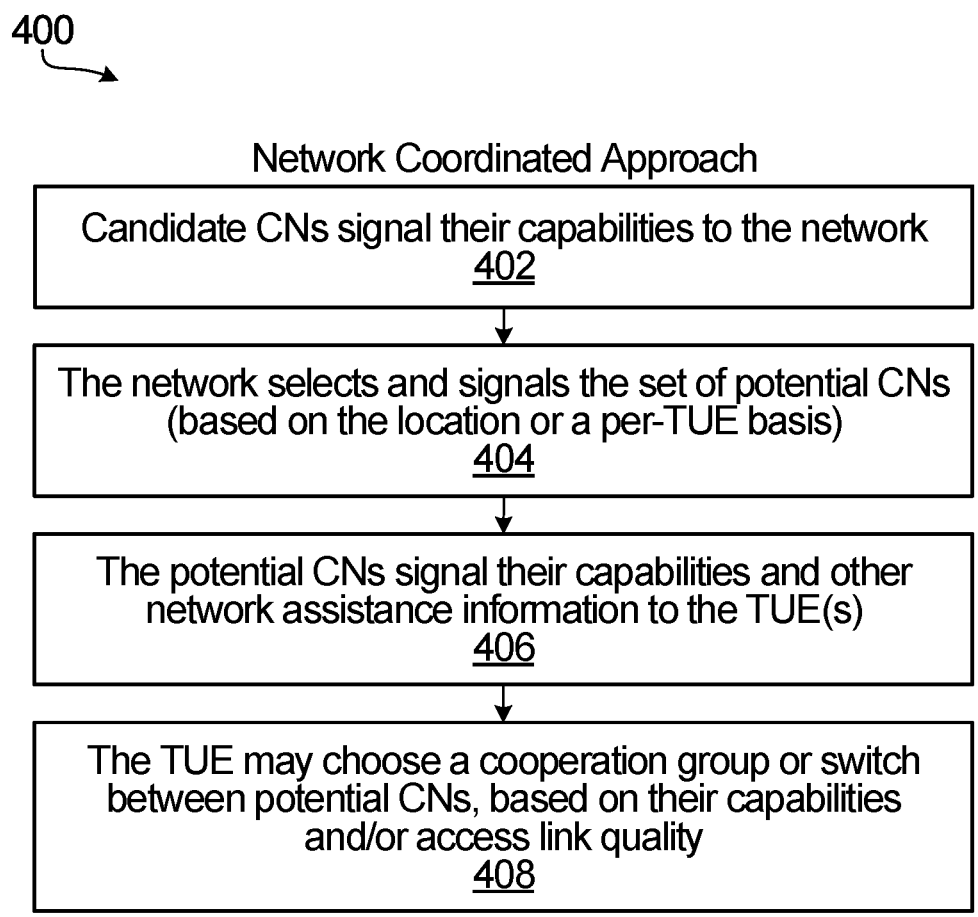
FIG. 4 is a flow diagram illustrating a network coordinated approach according to an embodiment.

A first approach is referenced herein as a network coordinated approach. FIG. 4 is a flow diagram illustrating a network coordinated approach 400 according to an embodiment. As shown, candidate CNs signal their capabilities to the network at 402, and at 404 the network selects a set of potential CNs for each region based on location or for a particular TUE on a per-TUE basis, and transmits signaling to the selected potential CNs. Thus, in the example network coordinated approach 400, the network selects or specifies the potential CNs that may be involved in cooperation. Candidate CNs that may not be involved in cooperation may also or instead be identified. At 406, the potential CNs transmit signaling that is indicative of their capabilities and other network assistance information to the TUE(s), and at 408 a TUE selects between multiple cooperation-enabled integrated access options, shown by way of example as choosing a cooperation group or switching between potential CNs. The selection at 408 is based on CN capabilities in the example shown, and access link quality is also shown at 408 as an example of another parameter, in this case based on a local measurement by the TUE, that may be taken into account in the selection. Network assistance information provided to a TUE may also or instead be applied in making a selection between options for cooperation-enabled integrated access.

A second approach is referenced herein as a network assisted approach. FIG. 5 is a flow diagram illustrating a network assisted approach 500 according to an embodiment. As shown at 502, the network may impose some constraints or preferences, in terms of CN capabilities and/or connections for example, so that each CN may determine whether it can potentially be involved in cooperation. In the example shown, the network further specifies the anchor point and possibly cell identifier(s) and cooperation mode, at 504, for a particular location or TUE. In other embodiments, the network may specify such parameters as any one or more of: the anchor point(s) for connection, cell identifier(s), and mode for cooperation, based on location or on a per-TUE basis. At 506, the potential CNs transmit signaling indicative of their capabilities and other network assistance information to the TUE(s), and at 508 a TUE selects between multiple cooperation-enabled integrated access options, shown by way of example as choosing a cooperation group or switching between potential CNs. The selection at 508, as in 408 in FIG. 4, is based on CN capabilities in the example shown, and access link quality is also shown at 508 as an example of another parameter that may be taken into account in the selection. Network assistance information provided to a TUE may also or instead be applied in making a selection between cooperation-enabled integrated access options.

In a network assisted approach, the network may configure or pre-configure the terrestrial and non-terrestrial subsystems, the anchor points for connection, and possibly the mode for cooperation. In a network coordinated approach, the network may select and transmit signaling to the potential CNs, and possibly also select and transmit signaling indicative of cooperation mode, based on the location or on a per TUE basis. In both cases, network assistance information is used by a TUE. A TUE may, for example, select or filter out potential CNs based on such parameters as their capabilities, anchor point, or other characteristics of their connection path(s) such as delay, load, reliability, number of hops, etc. A TUE may also or instead select a set of N CNs or choose between CNs based on one or more parameters such as access link quality, bandwidth efficiency (BWE), power efficiency, connection stability, coverage duration, etc.

The constraints or preferences in a network assisted approach impose conditions or limitations that may narrow down the number of potential CNs that may participate as CNs in cooperation. Examples of such constraints or preferences related to capabilities include position awareness capability, access technologies such as full-duplex transmission capability, and antenna configuration such as ability to communicate with one or more satellites. Whether a CN can actually exploit certain capabilities may depend on the environment in which it is located. For example, a CN may need a line of sight connection or link to exploit a position awareness capability.

The network may also or instead impose one or more constraints in terms of CNs connections to the network. Examples of such constraints include: required minimum distance from a cell edge or beam edge, for either or both of terrestrial and non-terrestrial subsystems, to help avoid low Signal to Noise Ratio (SNR) on CN connections for example; a threshold $\eta_p$ on BWE for CN connections to a terrestrial or non-terrestrial subsystem p; a maximum hop count for a CN connection to an anchor point or other subsystem component; a maximum distance for a CN connection to an anchor point or other subsystem component; and a minimum distance from other CNs or BSs of different subsystems.

Network configurations may also or instead define preferences among CNs that are connected to different subsystems. For instance, the network can define fixed or location-based priorities for CNs of different subsystems. Location-based priorities or configurations can be specified explicitly in some embodiments, for example by signaling geographical coordinates of one or more reference points in the network. Priorities can then be defined in terms of distance from different reference points, such as network device positions, cell/beam center positions, etc. For application of explicit location-based priorities, CNs should be aware of their own position. Location-based priorities can instead be characterized implicitly in terms of one or more other parameters, such as reference signal received power.

Although these constraints or preferences are discussed in the context of a network assisted approach, constraints or parameters including these and others disclosed herein, may also or instead be used in a network coordinated approach. The network may apply one or more constraints or parameters for selection of potential CNs from a pool of candidate CNs at 404 (FIG. 4), for example.

Figure 6:
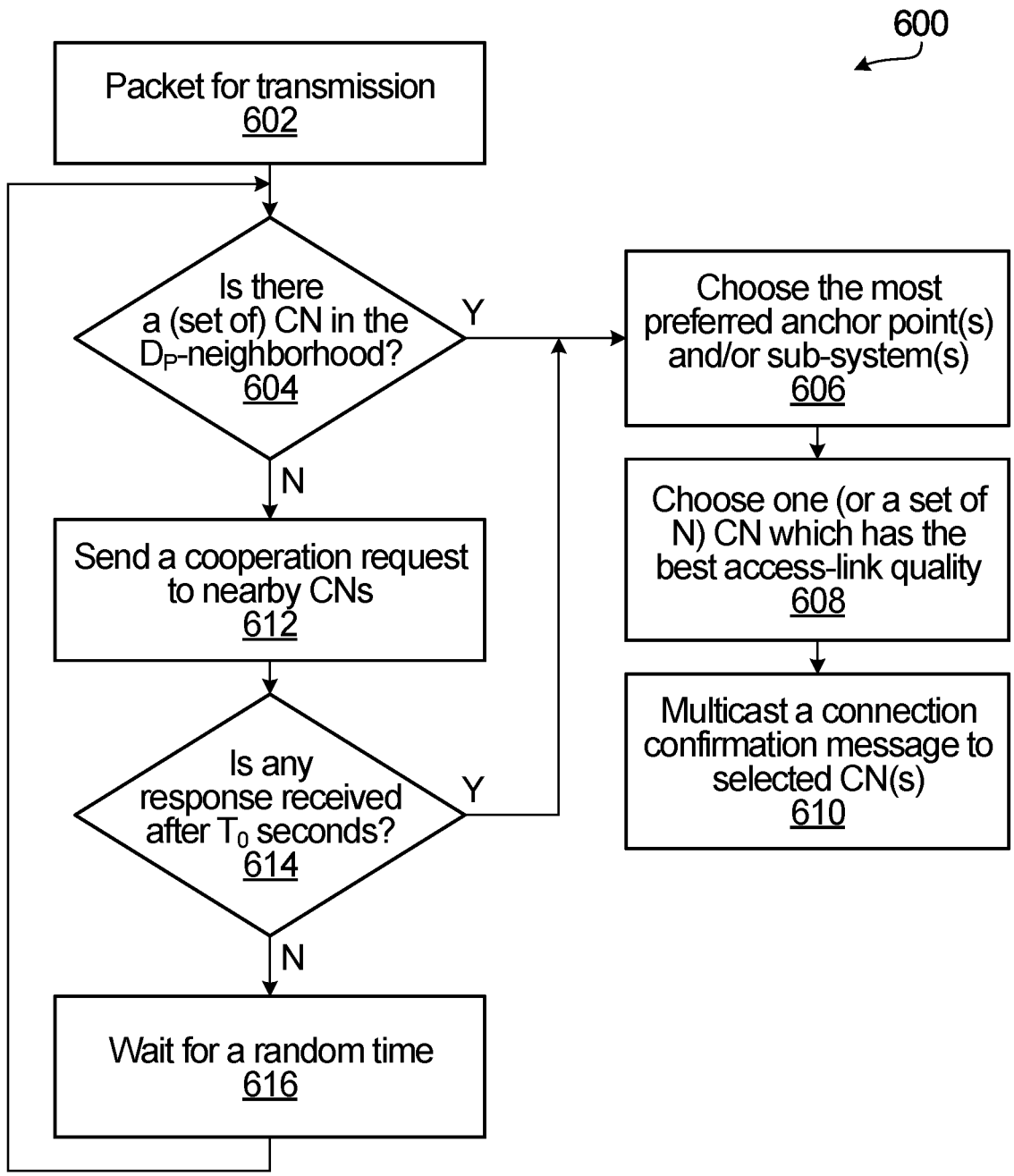
FIG. 6 is a flow diagram illustrating an example of a method to initiate a cooperative connection.

FIG. 6 is a flow diagram illustrating an example of a method to initiate a cooperative connection. The example method 600 relates to an embodiment in which a TUE has a packet for transmission, as shown at 602. Unless the TUE is already aware of the presence of a set of one or more CNs connected to a desired subsystem p in its coverage region, indicated Dr-neighborhood at 604, the TUE sends a cooperation request to nearby CNs at 612.

If no response to the cooperation request is received after a time period, shown as $T_0$ seconds at 614, then the TUE may wait before re-checking for CNs at 604. The wait time is shown at 616 as a random wait time, but need not necessarily be random. A wait time may be useful, for example, to provide additional response time for receiving responses from CNs that are connected to the desired subsystem p but are located multiple hops away from the TUE.

At 606, the TUE chooses the most preferred anchor point(s) and/or subsystem(s), and at 608 also chooses a set of N, N≥1, CNs using network assistance information. Other information, such as one or more local measurements shown by way of example as access link quality, may also or instead be applied in choosing the CN(s). At 610, a connection confirmation message is sent by the TUE to the selected CN(s), and may be multicast to multiple CNs in some embodiments. The connection confirmation message may specify the selected CNs, and in some embodiments the TUE ranks the CNs. The first CN in a ranked set may manage the operation of other selected CNs in the set, which form a cooperation group to assist the TUE.

The coverage region $D_p$ referenced in FIG. 6 is a parameter that may be set by the network depending on such factors as any one or more of: a coverage map or topology of different subsystems, UE activity patterns, and UE distribution in each region. The network may also or instead set other parameters to be taken into account at 604 or otherwise used in establishing a cooperative connection, including any one or more of the following, for example: a maximum transmission power; a threshold minimum received power; minimum distance between two CNs; maximum number $N_{max}$ of CNs; minimum number $N_{min}$ of CNs; and contention window duration.

Figure 7:
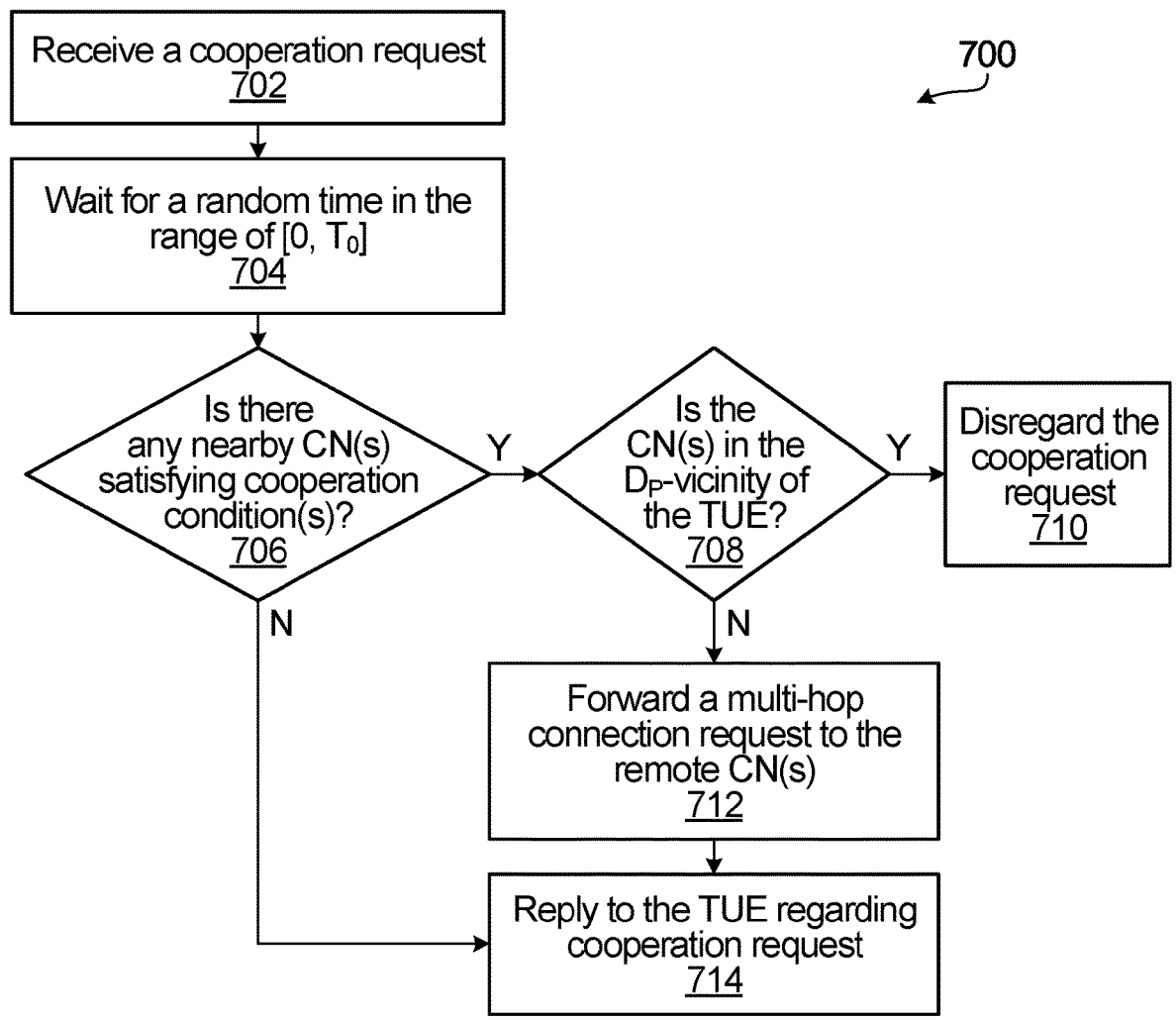
FIG. 7 is a flow diagram illustrating an example of a method for handling a cooperation request.

FIG. 6 references a connection request transmitted from a TUE to nearby UEs. FIG. 7 is a flow diagram illustrating an example of a method for handling a cooperation request. The example method 700 relates to a scenario in which a potential CN receives a cooperation request as shown at 702.

Given priorities for different subsystems, a CN, referenced in this example as CNx, connected to a subsystem p that has an associated priority, may serve as a selected CN in a cooperation group. Such a CN may reply to a cooperation request at 714, after waiting for a random time between 0 and $T_0$ at 704 in the example shown, unless there are already one or more CNs that satisfy a cooperation condition. A cooperation condition may be, for example, (a) a potential CN connected to a subsystem of higher priority in the coverage region of CNx, or (b) a potential CN of the same priority as CNx in its $\delta_p$-vicinity, wherein $\delta_p$ is a minimum distance required by the network among CNs of subsystem p. A CN may also or instead consider the BWE of its connection to the network compared to that of other CNs in its coverage region. For example, under a condition (c) the CNx, connected to subsystem p, may recede from cooperation if there exists a potential CN, referenced in this example as CNy, of the same priority but with a BWE difference greater than a threshold $\theta_p$, such that $BWE_y - BWE_x > \theta_p$. A determination based on one or more cooperation conditions is illustrated in FIG. 7 at 706.

If alternative CN(s) that satisfy a cooperation condition at 706, such as the above examples (a), (b), and (c), are not in the coverage region $D_p$ of the TUE that is requesting a connection or integrated access, then the CNx may redirect a cooperation request to establish a multi-hop connection through the alternative CN(s). A determination regarding the coverage region $D_p$ of the TUE is shown at 708, and redirection of a cooperation request is shown by way of example at 712 as forwarding a multi-hop connection request to one or more other CN(s), referenced as remote CN(s) at 712 because they are remote from the TUE in the sense that they are outside the coverage region of the TUE. A CN that redirects a cooperation request at 712 may reply to the TUE regarding the cooperation request at 714.

A potential CN disregards a cooperation request at 710 if a preferable CN already exists in the coverage range of the TUE.

In some embodiments, information indicative of a geo-location can be included in cooperation signaling. For example, information indicative of a geo-location of the TUE can be included in the cooperation request if known to the TUE, and similarly information indicative of a geo-location of a CN can be included in a cooperation offer if known to the CN. In embodiments in which no geo-location information is included in cooperation signaling, the vicinity of a first CN to the TUE can be inferred at the TUE from received signal power, and at another CN based on whether the first CN replies within a certain period of time, such as $T_0$ in the example shown in FIG. 7.

A procedure similar to the example shown in FIG. 7 may be performed by potential CNs that are not currently connected to a subsystem. For example, a CN that has cooperation capability but is not connected to any subsystem may handle a cooperation request, at least by forwarding the request to a next hop for example, unless a cooperation condition holds for another CN that is responding to the TUE.

A cooperation request may also or instead include other information, such as an identifier or location of a desired anchor point. In this case a potential CN might disregard or otherwise not respond to a cooperation request only if another potential CN that satisfies a cooperation condition has a connection to, or is attempting to establish a connection to, the same anchor point.

CNs that meet any conditions or preferences to serve as a potential CNs may transmit signaling, either on a regular basis or in response to cooperation requests from TUEs, to nearby TUEs. Such signaling may be indicative of, for example, capabilities and characteristics of connection path(s) to the TUEs. Connection path characteristics may include, for example, any one or more of the following: the involved subsystem(s), identity and/or location of an anchor point such as a gNB or gNB-CU identity, number of hops to the anchor point, subsystem priority, a latency such as average latency to the anchor point, effective capacity of the connection, a load-dependent measure for the connection, trajectory, an estimate of connection stability, and estimated coverage duration.

Regarding identity and/or location of an anchor point, at least anchor point identity of a gNB-CU may help avoid unnecessary handover. Signaling that indicates the location of different anchor points of each subsystem may also or instead allow out-of-range UEs to determine whether they can establish a new connection, possibly as a multi-hop connection toward an anchor point.

The Quality of Service (QoS) that is achievable over a connection depends at least in part on the involved subsystems in which the connection is established. For example, a satellite link results in a long latency that may not be acceptable for all applications, and therefore it may be preferable to communicate signaling indicative of the subsystem(s) or type of subsystem(s) involved in a connection for each CN. A TUE can then establish a connection through CNs that are selected based in part on preferred or desirable subsystem(s). The identity of an anchor point may also be particularly important from a connection standpoint, to enable a TUE to decide on a set of CNs that can support a certain cooperation mode for example. Consider cooperation at the MAC layer, for which connection paths for different CNs should terminate at the same gNB, or at least the same gNB-CU.

Subsystem priority may be fixed or location-based for each subsystem. A location-based priority may be especially useful for initial access or UEs in idle mode, for example, to help UEs to decide between CNs of different subsystems.

Depending on TUE capabilities such as processing and/or storage capabilities, CN connections having lower latency to an anchor point within a certain range may be preferred, and latency can be used to decide between different connections or CNs of different subsystems. Regarding different subsystems, in some embodiments it is possible that CNs with satellite links may not coexist with terrestrial-connected CNs in the same cooperation group for a TUE with a limited buffer, and in such embodiments latency may be a useful characteristic for selecting between CNs with terrestrial and non-terrestrial connections.

Although absolute end-to-end latency to deliver a packet may be important to meet QoS requirements or targets for a TUE, it may also be important that the latency for a group of CNs over different paths is within a certain range. Depending on processing and storage capabilities of a TUE, for example, it may be desirable for differences in latency for CNs over different paths through different subsystems to be within a certain threshold, so that the TUE can use transmissions and/or re-transmissions over different paths for in-sequence reception of packets.

Characteristics such as trajectory, including speed and direction of movement, and expected coverage duration may be important for moving CNs such as airborne devices. A CN trajectory can be used to estimate coverage duration and/or stability. In the case of an airborne device such as the drone-based device 318 (FIG. 3), the coverage duration of the airborne device can be used to determine an expected coverage duration for a multi-hop connection through that device.

This example of an airborne device illustrates that not only UEs, but also other devices including network devices such as TRPs, may provide information to TUEs for use by the TUEs in selecting between multiple cooperation options for integrated access.

From the viewpoint of coverage stability and in order to maximize or at least improve coverage duration, it may be further useful for a moving CN to provide its trajectory to a TUE so that the TUE can choose a CN which is best aligned with its own trajectory. CN selection based on CN and TUE trajectory may at least increase coverage duration relative to selection of a moving CN without taking trajectories into account.

Parameters such as those described herein, and perhaps especially identity of an anchor point, may be particularly important for mobility management, when a TUE is to switch its connection path from one CN to another. As an example, consider again the integrated network of terrestrial and non-terrestrial components in FIG. 3, and a scenario in which TUE0, a regular UE without satellite access capability, is initially connected to the satellite network by means of cooperation though CN1 but is moving towards CN2 and CN4. As described above for this example, TUE0 may switch to either CN2, CN4, and CN6 without an L3 handover, whereas path switching to CN3 would involve an L3 handover between two different gNBs at GS1 and GS2. This example illustrates how considering the identity of the anchor point for each CN may be useful when making a path-switching decision, so as to avoid an unnecessary handover.

In this example, the TUE is able to locally switch from CN1 to either CN2 or CN4 without any signaling through the satellite node, by exploiting the multicast feature of satellite transmissions for example. TUE0 may also locally switch to CN6, which would involve signaling to the anchor point at GS1 to establish a multi-hop connection over the terrestrial network. To avoid delayed signaling back to the satellite, however, TUE0 can send a path-switching request directly to the selected CN if switching to CN2 or CN4. In the case that a data path does not exist for TUE0 at the selected CN, as is the case for CN6, it would need to communicate back to the anchor point at GS1 to establish the connection. The incurred latency to establish a connection to CN2 or CN4 may be much lower compared to signaling over a satellite connection.

In this particular example, CN2 and CN4 could be preferred over CN6, if TUE0 is aware of its own trajectory as well as the locations of the CNs. Moreover, the connection path through CN6 encompasses several hops, and therefore might not be reliable. In other words, fewer hops might be preferred by a TUE from the viewpoint of reliability.

Finally, CN2 may be preferred over CN4, because CN4 is located at the beam edge and may suffer from a lower BWE than CN2.

In general, given network configurations for mobility management, such as configuration of anchor point(s) for connections or conditions to execute a handover to another anchor point, a TUE may in some embodiments first filter potential CNs based on one or more factors, such as the anchor point(s) of connection, CN capabilities, and other characteristics of CN connection paths that are important to meet TUE QoS requirements, such as end-to-end delay, for a particular application. Among the remaining CNs, the TUE can then select a set of one or more CNs that results in the best performance in terms of BWE, connection stability and reliability, and power efficiency, to establish a connection across different subsystems.

Another potential application of disclosed embodiments is for initial access, wherein there could be less coordination from the network while UEs are not connected. In such a scenario, the network can provide CNs and TUEs with some pre-configurations that can help a TUE to establish a connection through the best subsystem in a self-organized fashion. In a network coordinated approach, the network can configure which candidate CNs should serve as a potential CN at each location. In a network assisted approach, the network can provide the UEs with a list of preferred subsystems and/or preferred anchor points for connection at each location. The network can also or instead provide the UEs with location-based priorities for different subsystems. A TUE can then establish a connection through CNs of the most preferred subsystem(s) and, if instructed, through the most preferred anchor point(s). One or more other metrics, such as connection path characteristics, CN capabilities, and access link quality, may then be considered by the TUE to establish a connection through a particular CN of the most preferred subsystem.

Figure 8:
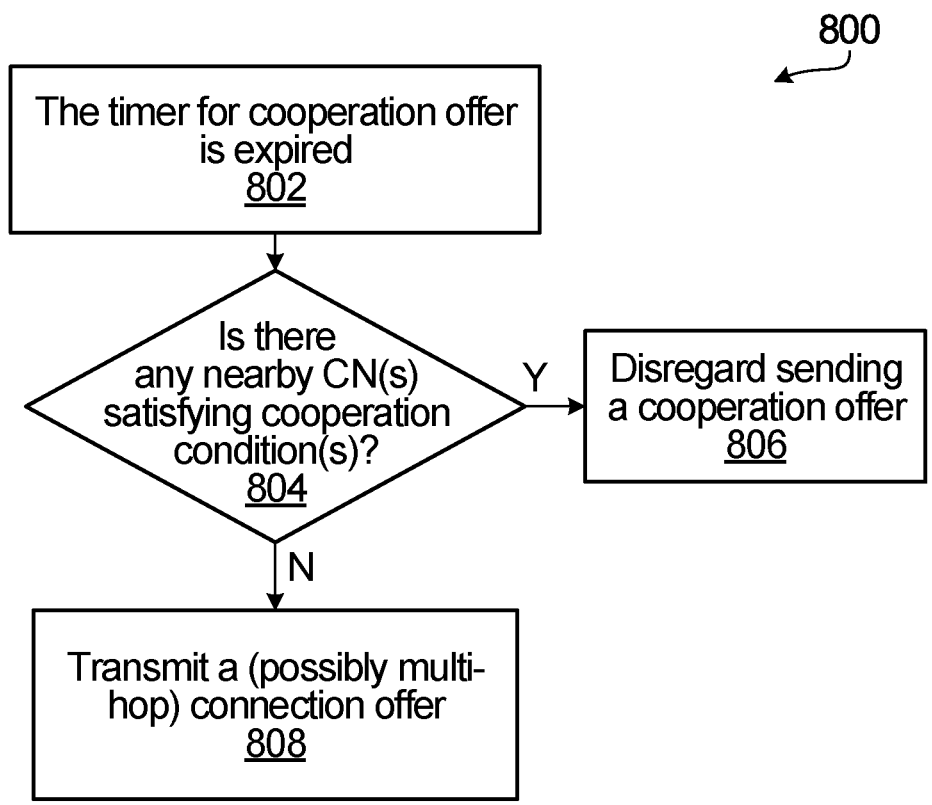
FIG. 8 is a flow diagram illustrating an example of a method related to cooperation offers.

Various embodiments related to selection between different cooperation-enabled integrated access are described above. Other embodiments are also possible. For example, FIG. 8 is a flow diagram illustrating an example of a method related to cooperation offers. The example method 800 illustrates a procedure for potential CNs, in which transmission of a cooperation offer is triggered by expiry of a timer, as shown at 802. In a timer-based embodiment, a CN with cooperation capability, connected to a subsystem p, regularly transmits a cooperation offer to one or more TUEs at 808, unless there exist one or more other CNs that satisfy a cooperation condition, as determined at 804. Examples of cooperation conditions are provided elsewhere herein, such as with reference to FIG. 7. A potential CN disregards or holds off transmitting a connection offer as shown at 808 if one or more other CN(s) satisfy a cooperation condition.

A time-based trigger is an illustrative example of a trigger. Other triggers or criteria may also or instead be used by CNs in other embodiments. For example, in a network coordinated approach the timer referenced at 802 may be initiated or started only after a CN receives signaling from a network device indicating that it has been selected as a potential CN.

The embodiments above relate primarily to provision of multiple options for integrated access and selection between those options by a TUE. Examples of information that is used or applied by a TUE to decide between different cooperation-based integrated access options, such as various connection paths across different CNs, are disclosed herein. Such information may be classified into three categories. One category is network assistance information, such as identity of an anchor point, number of hops to the anchor point, the involved subsystems, and priority for each subsystem, which are provided to CNs by the network, through TRPs or other intermediate devices in some embodiments, and then is redirected from the CNs to the TUEs. Another category of information includes CN capabilities and possibly network-related parameters that are calculated, estimated, or otherwise determined by the CNs. Signaling indicative of such information, which may be the same signaling that carries the network assistance information or different signaling, is transmitted by CNs to TUEs. Examples of parameters determined by CNs include effective capacity of the CN connection to the network, delay to the anchor point, connection reliability, estimated coverage duration, and CN trajectory. Yet another category of information for use or application by a TUE in selecting between cooperation-enabled integrated access includes parameters that are found, estimated, or otherwise determined by the TUE using local measurements. Examples of these parameters include access link quality such as power efficiency for the TUE, achievable BWE, etc.

Figure 9:
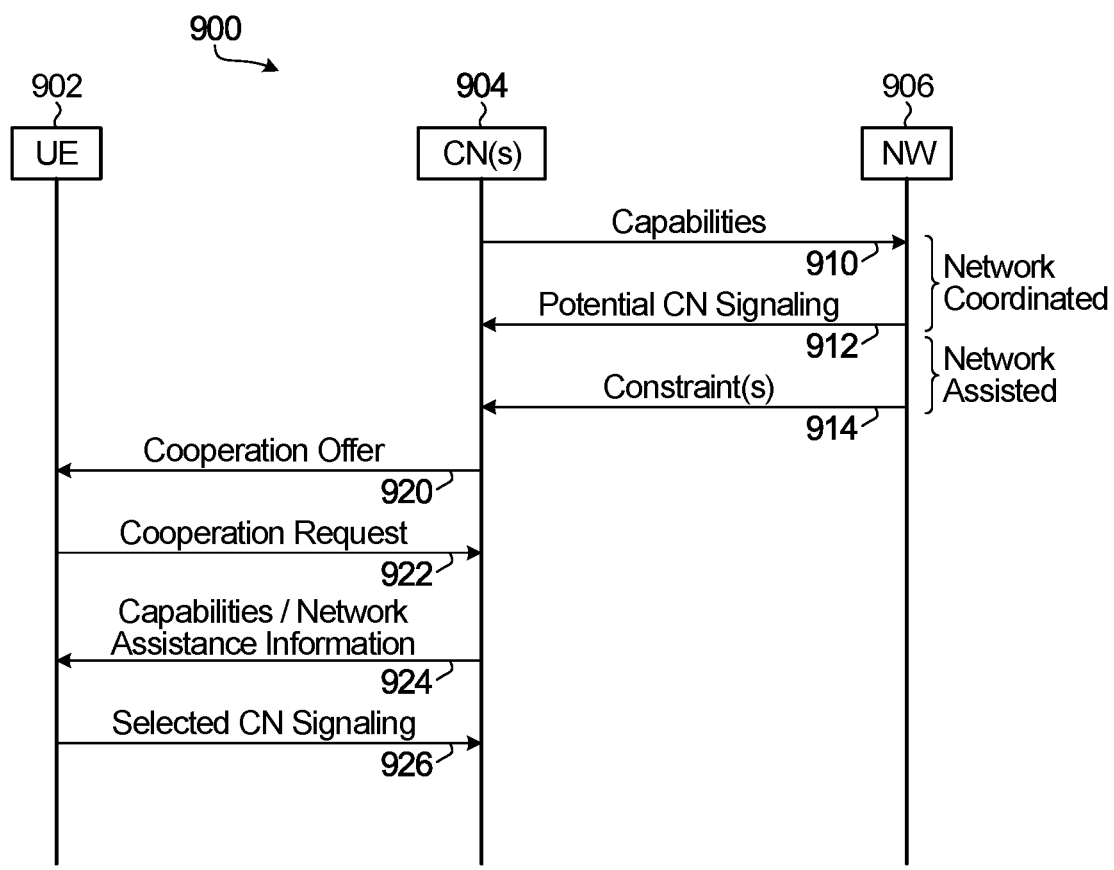
FIG. 9 is a signal flow diagram illustrating signaling according to another embodiment.

FIG. 9 is a signal flow diagram illustrating signaling according to another embodiment. The example signal flow 900 includes signaling that may be communicated between a UE 902, one or more CN(s) 904, and one or more network devices shown generally as NW 906. In this example, the UE 902 is a TUE that is to be assisted for integrated access, through cooperation with one or more of the CNs 904.

In a network coordinated approach, signaling indicative of CN capabilities is communicated at 910. This signaling is transmitted by one or more candidate CNs 904 and received by the NW 906. A network coordinated approach also involves communicating signaling to one or more candidate CNs that are selected by the NW 906 to be potential CNs. The signaling at 912 is transmitted by the NW 906 and received by at least any potential CNs at 904 that have been selected. To be clear, not all candidate CNs that transmit signaling at 910 are necessarily selected by the NW 906 to be potential CNs, and therefore the signaling at 912 might not be communicated between the NW 906 and all candidate CNs that transmitted signaling at 910.

Signaling associated with a network assisted approach is also shown in FIG. 9. Such signaling is shown by way of example at 914 as signaling indicative of one or more constraints, and is transmitted by the NW 906 and received by one or more candidate CNs 904.

It should be appreciated embodiments may use either or both of a network coordinated approach and a network assisted approach. Example signaling associated with both approaches is shown in FIG. 9 for the sake of completeness, but FIG. 9 is not intended to imply that both approaches are necessarily used in all embodiments.

Example signaling between potential CNs 904 and the UE 902 is also shown in FIG. 9. Potential CNs may be selected or determined by the NW 906 in a network coordinated approach, or by each CN 904 itself in a network assisted approach.

Some embodiments may involve either or both of cooperation offers and cooperation requests. Signaling indicative of a cooperation offer is shown at 920, and is transmitted by one or more potential CNs 904 and received by the UE 902. Signaling indicative of a cooperation request is shown at 922, and is transmitted by the UE 902 to one or more potential CNs 904. Not all embodiments necessarily involve cooperation offers or cooperation requests.

At 924, FIG. 9 shows signaling that is indicative of CN capabilities, network assistance information, or both. Such signaling, transmitted by one or more potential CNs and received by the UE 902, allows the UE to select between the potential CNs for cooperation-enabled integrated access. Although not explicitly shown in FIG. 9 to avoid further congestion in the drawing, signaling from the NW 906 to the CN(s) 904 may include network assistance information determined by the NW 906, and such information may be forwarded or otherwise provided to the UE 902 by the potential CN(s) at 924.

The signaling at 926 represents signaling that is communicated by transmission from the UE 902 and reception at each selected CN 904 that is selected by the UE for cooperation.

FIG. 9 is an illustrative example. Other embodiments may include additional, less, and/or different signaling.

The example 900 encompasses various embodiments. A method in an integrated wireless communication network that includes terrestrial and non-terrestrial network devices, for example, may involve communicating signaling that is indicative of information for application by a UE in selection between multiple cooperation nodes to provide the UE with access to a non-terrestrial network device in the integrated wireless communication network. Communicating signaling may involve transmitting by any of various devices, receiving by any of various devices, or both. For example, a method performed by a UE may involve receiving signaling indicative of information for application by the UE in selection between multiple cooperation nodes to provide the UE with access to a non-terrestrial network device in the integrated wireless communication network; and also selecting between the multiple cooperation nodes based on the information. A method performed by a cooperation node may involve transmitting, to a UE, such signaling that is indicative of information for application by the UE in selection between multiple cooperation nodes, including the cooperation node, to provide the UE with access to a non-terrestrial network device in the integrated wireless communication network.

In some embodiments, the information is or includes network assistance information that is determined by a network device in the integrated wireless communication network. Examples of network assistance information are provided elsewhere herein, and may include any one or more of: identity of an anchor point, number of hops to an anchor point, delay to an anchor point, involved subsystems, and priority for each of the involved subsystems. Signaling that is indicative of network assistance information need not necessarily be transmitted only by a network device and received by CN, and may also or instead be transmitted by a CN and received by a TUE, for example.

The information may be or include capability information indicative of capabilities of a CN. Signaling indicative of CN capabilities is shown by way of example at 910 and 924 in FIG. 9. Examples of capabilities provided herein include any one or more of: multi-connectivity, antenna configuration, position-awareness, ability to connect to non-terrestrial network devices, full-duplex connectivity, and supported frequencies.

The information may also or instead include one or more parameters determined by a CN. Examples of a parameter determined by a CN include effective capacity of the CN connection to the network, delay to an anchor point, connection reliability, estimated coverage duration, and CN trajectory.

Capability information and/or parameters determined by a CN may be transmitted by a CN to a TUE and received by the UE, and may also or instead be transmitted by a CN to a network device and received by the network device. For example, capability information is transmitted by a CN to a network device and received by the network device in a network coordinated approach.

From a network perspective, in a network coordinated approach the potential CNs between which a UE selects are determined by a network device, and communicating signaling may involve transmitting the signaling by the network device to the potential CNs, as shown by way of example at 912 in FIG. 9. Even though this signaling does not directly involve the UE that is to be assisted, the signaling may be indicative of information for application by the UE in selecting between multiple CNs to provide the UE with access to a non-terrestrial network device in the integrated wireless communication network. For example, the signaling may include network assistance information that is subsequently provided to the UE.

In a network assisted approach, a method may involve transmitting further signaling that is indicative of a constraint on CNs to provide the UE with access to a non-terrestrial network device. Transmitting such further signaling may involve transmitting the further signaling by a network device to a candidate CN for application of the constraint by the candidate CN in determining whether the candidate CN may be one of the multiple potential CNs between which the UE is to select. Signaling related to one or more constraints is shown by way of example at 914, and such signaling or additional signaling may be indicative of network assistance information for application by a UE in making a selection between multiple potential CNs.

Turning to CN behavior, in a network coordinated approach a method may involve receiving, by a CN from a network device, further signaling to indicate that the CN is one of the multiple potential CNs between which a UE is to select. Such further signaling is shown by way of example at 912 in FIG. 9. In this case, communicating signaling related to information that is to be applied by the UE in selecting between multiple CNs may involve transmitting, by the CN to the UE, the signaling after receiving the further signaling from the network device. This transmitting is illustrated in FIG. 9 at 924, for example.

In a network assisted approach, a method may involve receiving, by a CN from a network device, further signaling that is indicative of a constraint on CNs to provide the UE with access to a non-terrestrial network device in the wireless communication network. See 914 in FIG. 9 for an example. Transmitting signaling related to information that is to be applied by the UE in selecting between multiple CNs may then involve transmitting such signaling by the CN to the UE if the CN satisfies the constraint, as shown by way of example at 924 in FIG. 9.

From the perspective of a TUE, communicating the signaling indicative of the information that is to be applied by the UE may involve receiving the signaling. TUE behavior may also include transmitting further signaling to a selected CN that is selected by the UE for access to the non-terrestrial network device based on the information. FIG. 9 illustrates an example at 926.

TUE-selected integrated access may enhance service continuity by providing seamless access to out of coverage UEs which lack satellite-connection capability. Connection reliability may also or instead be enhanced, by enabling UEs to autonomously switch their local connections. In this way UEs, on board a vehicle for example, can timely respond to rapid changes over local short-range connections without delayed signaling on a satellite back-haul connection. Power saving for UEs with limited power budget and/or undesirable channel conditions may also or instead be realized. Another potential benefit is a reduction in signaling overhead on satellite links, including access and feeder links, by enabling self-organized cooperation, so that UEs do not need to send measurement reports for local connections to a satellite.

Cooperation-based integrated access can be further extended to addressing a challenge with handover for satellite connections. Particularly, handover signaling via non-terrestrial connections according to a conventional technique can take significant time because of the relatively long propagation delay for such connections. A connection could be interrupted for a long time during handover, in the absence of a multi-connectivity UE capability for example. A UE might not have multi-connectivity capability to maintain multiple satellite connections or other non-terrestrial connections at the same time for any of various reasons, such as any one or more of: limited power; a limited number of antennas; and the need for special circuitry, to compensate for Doppler shift for example. According to embodiments disclosed herein, a UE that is able to connect to only one satellite or other non-terrestrial network device at a time can exploit cooperation over short range connections to establish multi-connectivity with multiple non-terrestrial network devices, by organizing CNs in a cooperation group and exploiting cooperation in a self-organized fashion.

UEs in the same neighborhood or vicinity for example, and preferably with the same trajectory in some embodiments, may be organized in the same cooperation group. UEs in the cooperation group may also be arranged to be connected to different terrestrial and/or non-terrestrial network devices or nodes where available. Moreover, in case of a handover, only a subset of the UEs in the cooperation group are arranged to execute the handover procedure at a time. In this way, UEs that are involved in the handover may remain connected to a different terrestrial or non-terrestrial network node through the cooperative link(s) provided by the other UE(s) in a cooperation group. Satellite-connected nodes in a boundary region, for example, may organize themselves into groups, within which multi-connectivity is established by exploiting cooperation-based group handover.

Cooperation-based group handover is described primarily with reference to UEs. It should be appreciated that this is just an example, and handover embodiments may be applicable more generally to CNs and not only UEs.

Figure 10:
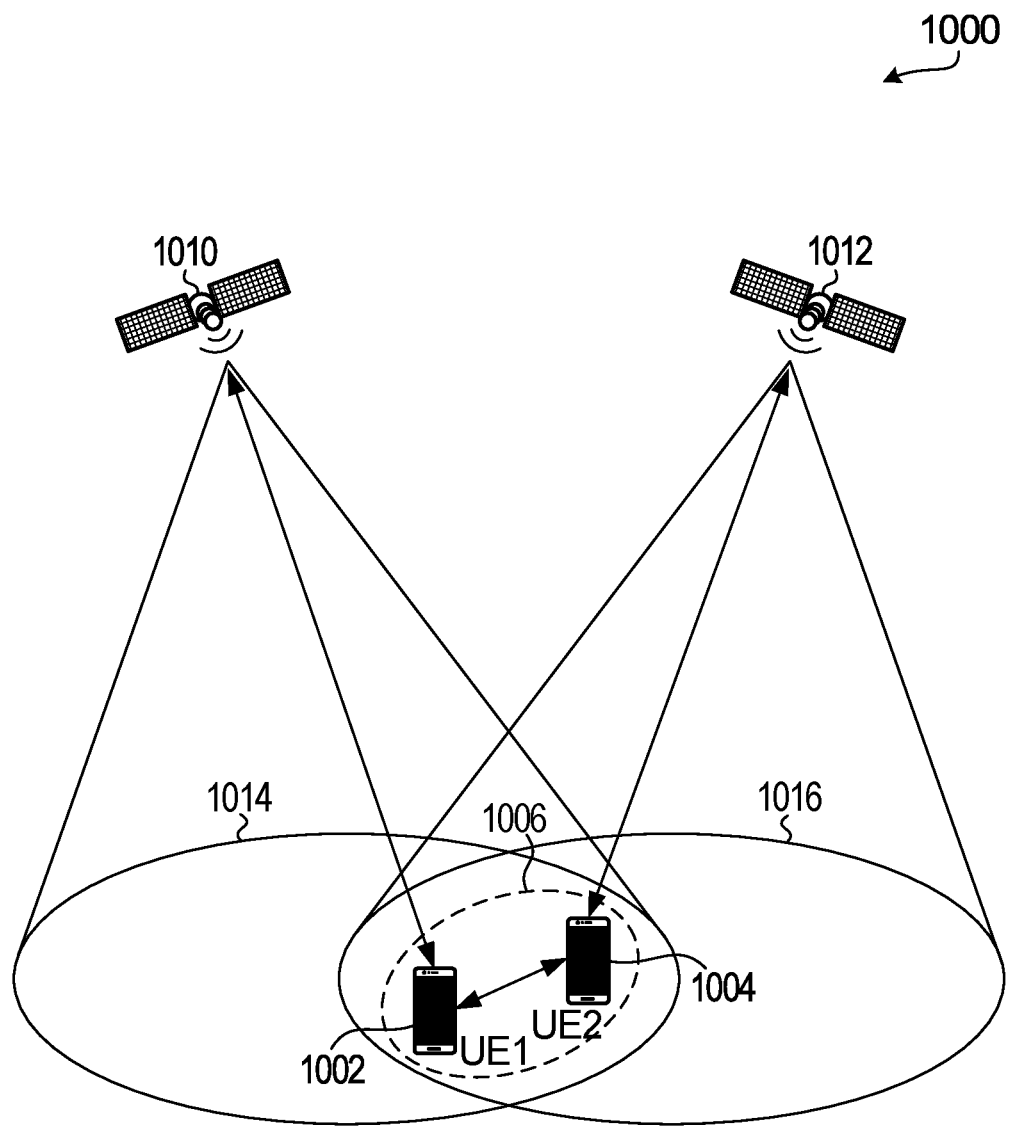
FIG. 10 is a block diagram illustrating another example communication network.

FIG. 10 is a block diagram illustrating another example communication network 1000, which includes satellites 1010, 1012 to provide respective coverage areas outlined at 1014, 1016, and satellite UEs 1002, 1004 in a cooperation group 1006. In this example, both of the UEs 1002, 1004 have satellite connection capability. In other embodiments, terrestrial subsystem components and regular UEs that cannot themselves communicate with the satellites 1010, 1012 may also be deployed and be provided with cooperation-enabled access to the satellites through the satellite UEs 1002, 1004.

For instance and without lack of generality, FIG. 10 illustrates an example scenario in which two satellite connected UEs 1002, 1004 are at the edge of two beams. Suppose, solely for illustrative purposes, that UE1 and UE2 are initially connected to the satellite 1010, and are moving into the coverage range 1016 of the satellite 1012. To avoid interrupted service during a handover procedure, UE1 and UE2 could be organized into a group, and configured to execute the handover in a sequential manner. Particularly, among the two UEs 1002, 1004 in the cooperation group 1006, or in general among any number of UEs in a cooperation group, the UE(s) with a better connection to a new non-terrestrial network device such as a satellite TRP are selected to execute the handover. This can be achieved in some embodiments using the same signaling proposed to exploit self-organized cooperation.

In the example shown in FIG. 10, UE2 is further from the edge of the coverage area 1016 of the satellite 1012, and is selected to first execute the handover to the satellite 1012.

UE2, however, remains connected to the satellite 1010 by exploiting a cooperative connection through UE1. In the same way, UE1 can also establish a connection to the satellite 1012 through UE2 after its handover procedure is completed. In an embodiment, UE1 may remain connected to the satellite 1010 while it can maintain an acceptable connection, so that both UEs 1002, 1004 can benefit from multi-connectivity. When the connection to the satellite 1010 is broken, UE1 can then switch over and synchronize to the satellite 1012, possibly by means of UE2, or remain connected to the satellite 1012 through the cooperative connection through UE2.

Figure 11:
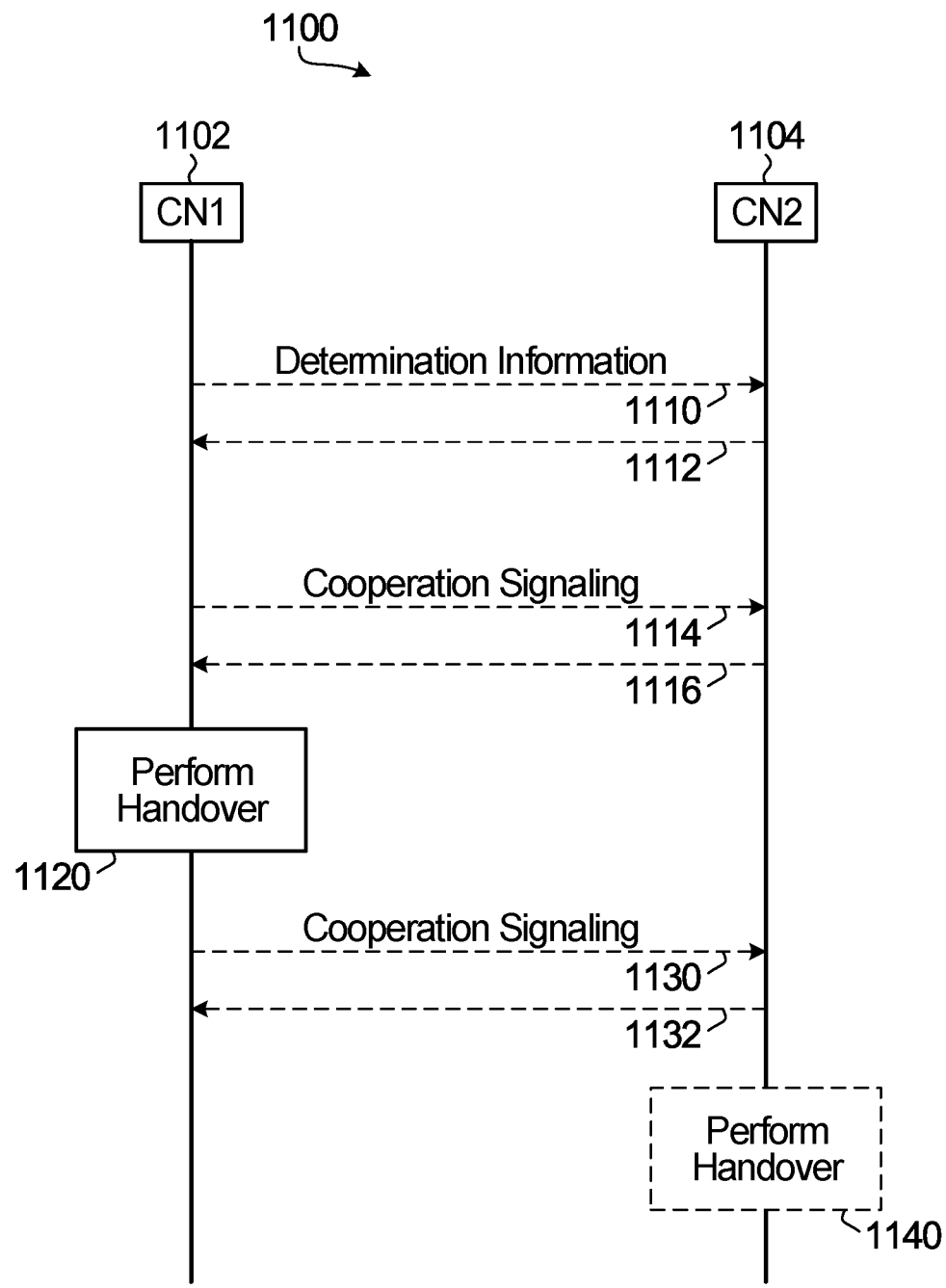
FIG. 11 is a signal flow diagram illustrating signaling according to another embodiment.

FIG. 11 is a signal flow diagram illustrating signaling according to another embodiment. The example 1100 relates to a scenario in which a CN1 1102 and a CN2 1104 are part of a cooperation group. CN1 and CN2 have respective connections to a first network device in an integrated wireless communication network.

The signaling illustrated at 1110, 1112 is indicative of information for application by a CN in determining whether that CN or another CN in the same cooperation group is to perform a handover procedure. Such signaling is communicated between CN1 and CN2, and may be transmitted by either of the CNs and received by the other CN, or transmitted by both CNs to each other.

In general, one or more CNs may transmit the signaling to one or more other CNs and/or receive the signaling from one or more other CNs. References herein to communicating signaling may include either or both of transmitting and receiving signaling.

Each CN may determine whether it or another CN in the cooperation group is to perform a handover procedure to transition from the current, first network device to another, second network device. In FIG. 10, the first and second network devices are the satellites 1010, 1012. More generally, in some embodiments at least one of the network devices is a non-terrestrial network device.

The signaling at 1110, 1112 is indicative of determination information, for application by each UE in making a handover determination. For illustrative purposes, consider cooperation-based handover from the perspective of CN1. The determination information indicated by the signaling at 1110, 1112 is for application by CN1 in determining whether: CN1 is to perform a handover procedure to establish a connection to a second network device in the integrated wireless communication network while CN2 maintains its connection to the first network device; or CN2 is to perform a handover procedure to establish a connection to the second network device while CN1 maintains its connection to the first network device. CN2 may also or instead make its own determination.

Regarding the determination information, one basis for a handover determination may be connection quality. For example, communicating signaling by CN1 may involve CN1 receiving the signaling from CN2, indicative of a connection quality associated with a connection between CN2 and the second network device. In this example, a method may also involve CN1 performing the handover procedure, as shown by way of example at 1120, responsive to determining that a connection quality associated with a connection between itself and the second network device is better than the connection quality associated with the connection between CN2 and the second network device. CN2 might make a similar determination when its connection to the second network device is of better quality than the connection between CN1 and the second network device.

A node that performs a handover procedure may maintain a cooperation-enabled connection to the network device to which it was connected before the handover. In the context of the example 1100, CN1 may maintain cooperation-enabled access to the first network device through CN2. For example, CN1 and CN2 may communicate cooperation signaling at 1114, 1116, such as a cooperation offer and/or a cooperation request, so that CN1 can maintain a connection with the first network device even during the handover at 1120 to establish a connection with the second network device.

In the example 1100, CN1 determines that it is to perform the handover procedure. In another possible scenario, CN1 maintains its connection to the first network device. CN1 may maintain its connection responsive to determining that the connection quality associated with the connection between CN2 and the second network device is better than a connection quality associated with a connection between CN1 and the second network device, for example. In that case, CN2 may determine, based on connection quality, that it is to perform the handover procedure. For example, communicating signaling may involve transmitting the signaling, by CN1 to CN2, indicative of a connection quality associated with a connection between CN1 and the second network device, to enable CN2 to make a handover determination based on relative connection quality.

Multi-connectivity during handover need not be maintained indefinitely. For example, after a certain amount of time following handover, after a new connection meets a minimum connection quality threshold, after a previous connection drops below a minimum connection threshold, or responsive to one or more other criteria, the other CN(s) in a cooperation group may perform the handover procedure to transition to a new network device. In the example 1100, this is shown at 1140, with CN2 performing the handover procedure. Cooperation signaling may be communicated between CN1 and CN2 at 1130, 1132 so that CN2 can avoid interruption during handover, by exploiting cooperation with CN1 and a cooperation-enabled connection through CN1.

Other embodiments are also possible. For example, determination information is described by way of example above as relating to connection quality, and is used in making a handover determination. In another embodiment, a method involves transmitting further signaling, by CN1 to CN2 for example, that is indicative of a determination made by CN1 as to whether CN1 or CN2 is to perform the handover procedure. In such an embodiment, CN1 may receive connection quality information from CN2, make a determination as to whether CN1 or CN2 is to perform the handover procedure based on relative connection quality, and transmit signaling to CN2 to inform CN2 of the determination. CN2 may then determine, based on signaling received from CN1 and the determination by CN1, whether it is to maintain its current connection to the first network device or perform the handover procedure to transition to the second network device. From the perspective of CN2, this example involves a CN receiving signaling from another CN, and the determination information that is to be used by the receiving CN is indicative of a determination that has been made by the other CN as to whether the other CN or the receiving CN is to perform the handover procedure.

These examples illustrate that one CN may inform one or more other CNs as to a handover determination or decision made by that CN. Such a determination or decision may be used by each other CN in making its own determination as to whether it should perform the handover procedure.

Although these examples refer to signaling indicative of a determination, other embodiments may involve communicating signaling indicative of a handover command or instruction to cause the receiving CN(s) to perform the handover procedure. For example, determination information that is transmitted by CN2 and received by CN1 at 1110 may be or include a command or instruction to cause CN1 to perform the handover procedure at 1120.

Handover of connections as disclosed herein may help reduce satellite access failure, and also or instead help prevent interruption in satellite access during a handover procedure, by exploiting multi-connectivity through cooperation-based group handover. Another potential benefit is reducing signaling overhead by enabling UEs to organize themselves in a cooperation group, wherein the handover is then executed by only a subset of UEs. The rest of the UEs in a cooperation group may be connected either through cooperative connections, or are assisted to synchronize to a new network device such as a TRP through other UEs in the cooperation group that are already connected to the new network device.

Another possible extension of cooperation as disclosed herein is to facilitate access for UEs with limited satellite-access capabilities. For example, some UEs might be able to communicate with a satellite, but might not have all the functionalities to facilitate access or mobility management. Position awareness, for example, is a feature that can be particularly useful for satellite access by providing the UEs with some position-based configurations on how to compensate for propagation delay so as to adjust the timing advance, to compensate for Doppler shift, and the like. Some UEs, however, might not have a position awareness capability. UEs with position awareness capability can help synchronize/time-align other UEs which lack such a capability. For instance, UEs with position awareness capability can send some additional information following capability signaling, to help other UEs to find their position. The more capable UEs may also or instead instruct their nearby UEs on how to compensate for such parameters as timing advance and/or Doppler shift.

Cooperation can also be useful in scenarios in which UEs have the same capabilities but different propagation conditions. A UE with line of sight channel, for example, may help other UEs such as those which are shadowed in an indoor environment or on board a vehicle.

Yet another possible embodiment relates to a scenario in which a TUE receives satellite signals in the downlink direction, but cannot communicate with the satellite in the uplink direction. The TUE might be running out of battery power or may lack some required capabilities such as certain antennas to provide sufficient link budget. This can be considered as another mode for cooperation that can be supported by embodiments disclosed herein.

These further embodiments illustrate other possible applications of cooperation that may enhance service continuity by facilitating access to satellite or other non-terrestrial network devices for UEs with limited capabilities. Another potential benefit is reducing the overhead on the satellite by avoiding at least some signaling, to help time-align or synchronize a UE for example, in cases where required information or assistance can be provided by a CN. Power saving may also or instead be realized for UEs with limited power budget and/or undesirable channel conditions. This, in turn, may enhance overall BWE in a network by preventing direct transmissions to and/or from the UEs with undesirable channel conditions, which otherwise waste communication resources.

Figure 12:
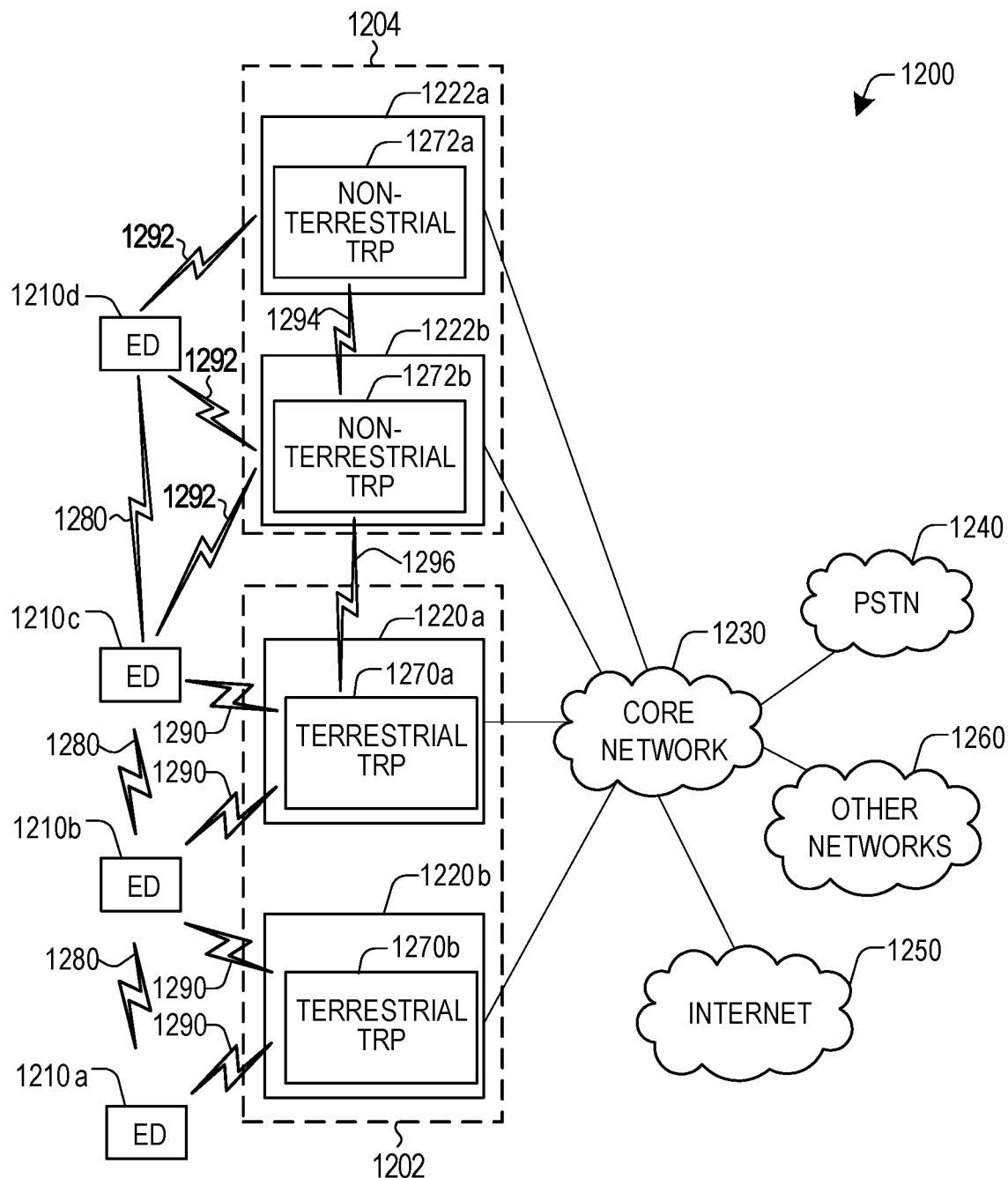
FIG. 12 is a block diagram illustrating a further example integrated communication system.

With reference now to FIG. 12, an example communication system 1200 in which aspects of the present disclosure are implemented in some embodiments is shown. In general, the system 1200 enables multiple wireless or wired elements to communicate data and/or other content. The purpose of the system 1200 may be to provide content (such as any one or more of voice, data, video, text, referred to collectively herein as "data") via broadcast, unicast, multicast, user device to user device, etc. The system 300 may operate efficiently by sharing communication resources such as bandwidth.

In this example, the communication system 1200 includes electronic devices (EDs) 1210a-1210d, Radio Access Networks (RANs) 1220a-1220b and 1222a-1222b, a core network 1230, a Public Switched Telephone Network (PSTN) 1240, the Internet 1250, and other networks 1260. Although certain numbers of these components or elements are shown in FIG. 12, any reasonable number of these components or elements may be included in the system 1200.

The EDs 1210a-1210d are configured to operate, communicate, or both, in the system 1200. For example, the EDs 1210a-1210d are configured to transmit, receive, or both via wireless communication channels or connections. Each ED 1210a-1210d represents any suitable end user device for wireless operation and may include such devices (or may be referred to) as a UE/device, wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, smart vehicle, or consumer electronics device. In some implementations, any or all of the EDs 1210a-1210d are terrestrial or non-terrestrial UEs.

In FIG. 12, the RANs 1220a-1220b include terrestrial TRPs (T-TRPs) 1270a-1270b, respectively, and provide a terrestrial communication network, subsystem, or sub-network 1202. T-TRPs are shown in FIG. 12 as an example of terrestrial network devices in an integrated communication network. Each T-TRP 1270a-1270b is configured to wirelessly interface with one or more of the EDs 1210a-1210d to enable access to any other T-TRP 1270a-1270b, the core network 1230, the PSTN 1240, the internet 1250, and/or the other networks 1260. The T-TRPs 1270a-1270b may be or include one or more of several devices, such as a base station, a base transceiver station (BTS), a Node-B (NodeB), an evolved NodeB (eNodeB), a Home eNodeB, a gNodeB, a site controller, an access point (AP), or a wireless router.

Any ED 1210a-1210d may be alternatively or additionally configured to interface, access, or communicate with any other T-TRP 1270a-1270b, the internet 1250, the core network 1230, the PSTN 1240, the other networks 1260, or any combination thereof. The communication system 1200 may include RANs, such as RAN 1220b, wherein the corresponding T-TRP 1270b accesses the internet 1250 via the core network 1230.

The RANs 1222a-1222b include non-terrestrial TRPs (NT-TRPs) 1272a-1272b, respectively, and provide a non-terrestrial communication network, subsystem, or sub-network 1204. NT-TRPs are shown in FIG. 12 as an example of non-terrestrial network devices in an integrated communication network. Each NT-TRP 1272a-1272b is configured to wirelessly interface with one or more of the EDs 1210a-1210d. Through an NT-TRP 1272a-1272b, one or more of the EDs 1210a-1210d may have access to, or be in communication with, any other of the EDs 1210a-1210d, any RAN 1220a-1220b, any terrestrial TRP 1270a-1270b, the core network 1230, the PSTN 1240, the internet 1250, and/or the other networks 1260. For example, the NT-TRPs 1272a-1272b may function similarly to one or more of: a BTS, a NodeB, an evolved eNodeB, a Home eNodeB, a gNodeB, a site controller, an AP, or a wireless router.

The EDs 1210a-1210d and the TRPs 1270a-1270b, 1272a-1272b are examples of communication equipment that can be configured to implement some or all of the functionality or embodiments described herein. In the embodiment shown in FIG. 12, each TRP 1270a, 1270b, 1272a, 1272b forms part of a respective RAN 1220a, 1220b, 1222a, 1222b, which may include other TRPs, base stations, Base Station Controller(s) (BSC), Radio Network Controller(s) (RNC), relay nodes, elements, and/or devices. Any TRP 1270a, 1270b, 1272a, 1272b may be a single element, as shown, or multiple elements, distributed in the corresponding RAN, or otherwise. Each TRP 1270a, 1270b, 1272a, 1272b may be configured to operate to transmit and/or receive wireless signals within a particular geographic region or area, sometimes referred to as a coverage area or cell. A cell may be further divided into cell sectors, and a TRP 1270a, 1270b, 1272a, 1272b may, for example, employ multiple transceivers to provide service to multiple sectors. In some embodiments a TRP 1270a, 1270b, 1272a, 1272b may be implemented as pico or femto nodes where the radio access technology supports such nodes. In some embodiments, Multiple-Input Multiple-Output (MIMO) technology may be employed having multiple transceivers for each coverage area.

The number of RANs 1220a-1220b, 1222a-1222b shown is one example only. Any number of RANs may be contemplated when devising the system 1200.

In the example shown, the T-TRPs 1270a, 1270b communicate with one or more of the EDs 1210a-1210c over one or more air interfaces 1290 using wireless communication links, such as Radio Frequency (RF), microwave, infrared (IR), etc. Communications with the ED 1210d may also be supported, but have not been shown in FIG. 12 in order to avoid further congestion in the drawing. The air interfaces 1290 may utilize any suitable radio access technology. For example, the system 1200 may implement one or more channel access methods, such as Code Division Multiple Access (CDMA), Time Division Multiple Access (TDMA), Frequency Division Multiple Access (FDMA), Orthogonal FDMA (OFDMA), or Single-Carrier FDMA (SC-FDMA) in the air interfaces 1290.

A T-TRP 1270a-1270b may implement Universal Mobile Telecommunication System (UMTS) Terrestrial Radio Access (UTRA) to establish an air interface 1290 using Wideband CDMA (WCDMA). In doing so, a T-TRP 1270a-1270b may implement protocols such as HSPA, HSPA+ optionally including HSDPA, HSUPA or both. Alternatively, a T-TRP 1270a-1270b may establish an air interface 1290 with Evolved UTMS Terrestrial Radio Access (E-UTRA) using LTE, LTE-A, and/or LTE-B. It is contemplated that the system 1200 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The example in FIG. 12 also illustrates that the NT-TRPs 1272a-1272b communicate with one or more of the EDs 1210b-1210d over one or more air interfaces 1292 using wireless communication links, such as RF, microwave, IR, etc. Communications with the ED 1210a may also be supported, but have not been shown in FIG. 12 in order to avoid further congestion in the drawing. The air interfaces 1292 may utilize any suitable radio access technology. For example, the communication system 1200 may implement one or more orthogonal or non-orthogonal channel access methods, such as CDMA, TDMA, FDMA, OFDMA, or SC-FDMA in the air interfaces 1292.

An NT-TRP 1272a-1272b may implement UTRA to establish a wireless link over an air interface 1292 using WCDMA. In doing so, the NT-TRPs 1272a-1272b may implement protocols such as HSPA, HSPA+ optionally including HSDPA, HSUPA or both. Alternatively, an NT-TRP 1272a-1272b may establish the wireless link over the air interface 1292 with E-UTRA using LTE, LTE-A, LTE-B, 5G NR and/or 6G. As noted above, other radio technologies for implementing wireless links include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized. The air interfaces 1292 may be substantially similar to the air interfaces 1290, or they may be substantially different.

The NT-TRPs 1272a-1272b communicate with each other over a wireless link 1294, and the NT-TRP 1272b communicates with the T-TRP 1270a over a wireless link 1296. Other inter-TRP communications may also be supported, but have not been illustrated in FIG. 12 in order to avoid further congestion in the drawing.

The wireless links 1294, 1296 may be substantially similar to other wireless links, such as those over the air interfaces 1290 and/or 1292, or they may be substantially different.

The RANs 1220a-1220b, 1222a-1222b are in communication with the core network 1230 to provide the EDs 1210a-1210d with various services such as voice, data, and other services. Understandably, the RANs 1220a-1220b, 1222a-1222b and/or the core network 1230 may be in direct or indirect communication with one or more other RANs (not shown), which may or may not be directly served by core network 1230, and may or may not employ the same radio access technology as any one or more of the RANs 1220a-1220b, 1222a-1222b. The core network 1230 may also serve as a gateway access between (i) the RANs 1220a-1220b, 1222a-1222b or EDs 1210a-1210d or both, and (ii) other networks (such as the PSTN 1240, the Internet 1250, and the other networks 1260). In addition, some or all of the EDs 1210a-1210d may include functionality for communicating with different wireless networks over different wireless links using different wireless technologies and/or protocols. PSTN 1240 may include circuit switched telephone networks for providing Plain Old Telephone Service (POTS). Internet 1250 may include a network of computers and subnets (intranets) or both, and incorporate protocols, such as IP, TCP, UDP. EDs 1210a-1210d may be multimode devices capable of operation according to multiple radio access technologies, and incorporate multiple transceivers necessary to support such technologies.

Direct communications between the EDs 1210a-1210d are also possible, and direct communication links 1280 between the EDs are shown in FIG. 12. As an example of direct ED-ED communications, UEs may communicate directly with each other over sidelinks.

FIG. 12 is illustrative of another example of an integrated wireless communication network in which embodiments disclosed herein may be implemented. The EDs 1210a-1210d are illustrative of devices that may be target or cooperating UEs, some of which have non-terrestrial communication capabilities, the T-TRPs 1270a, 1270b are examples of terrestrial network devices, and the NT-TRPs 1222a, 1222b are examples of non-terrestrial network devices. UE or CN features disclosed herein may be implemented in the EDs 1210a-1210d, and network features may be implemented at T-TRPs 1270a, 1270b and/or NT-TRPs 1272a, 1272b.

Figure 13A:
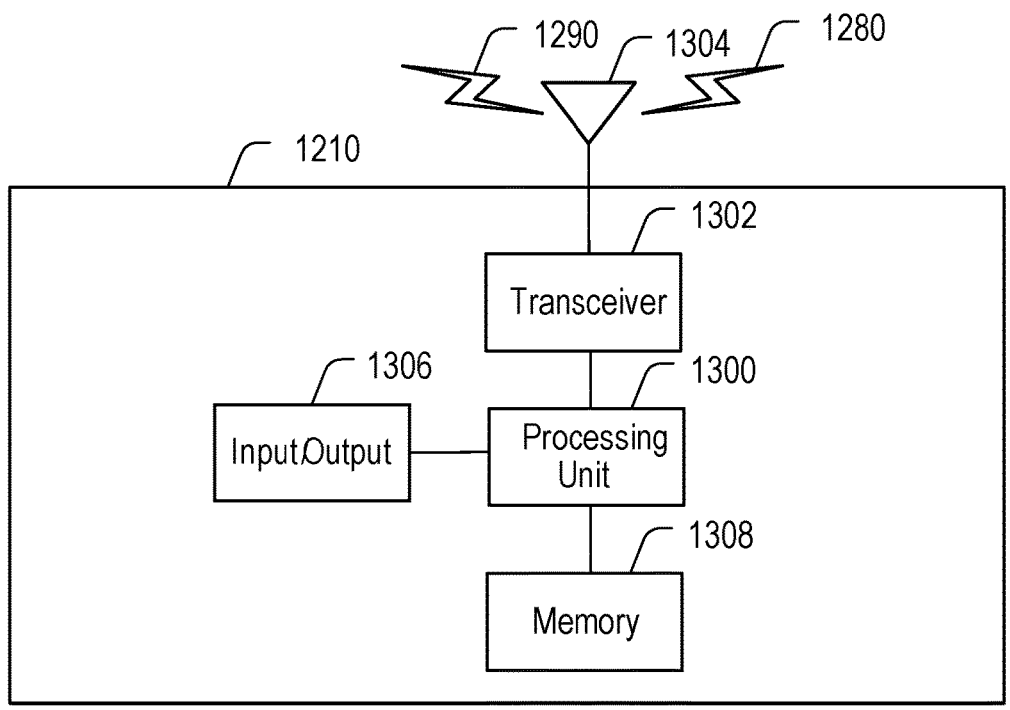
FIGS. 13A, 13B, and 13C are block diagrams illustrating example devices that may implement the methods and teachings according to this disclosure.
Figure 13B:
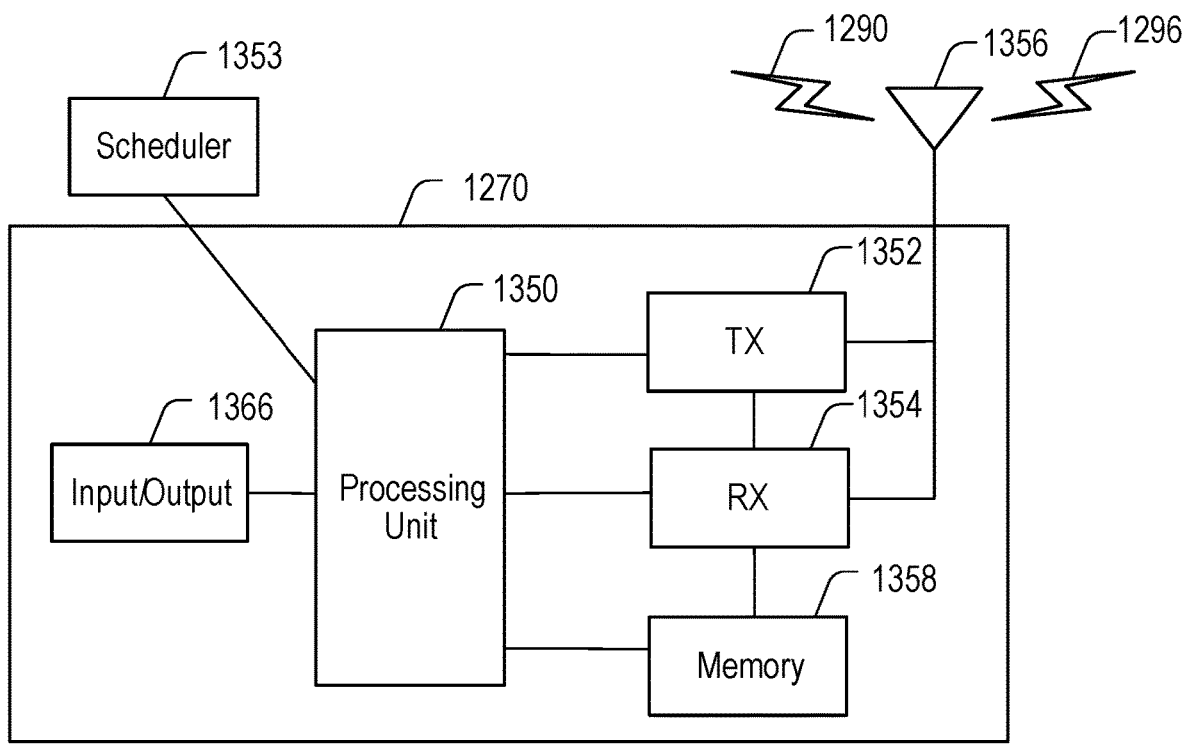
Figure 13C:
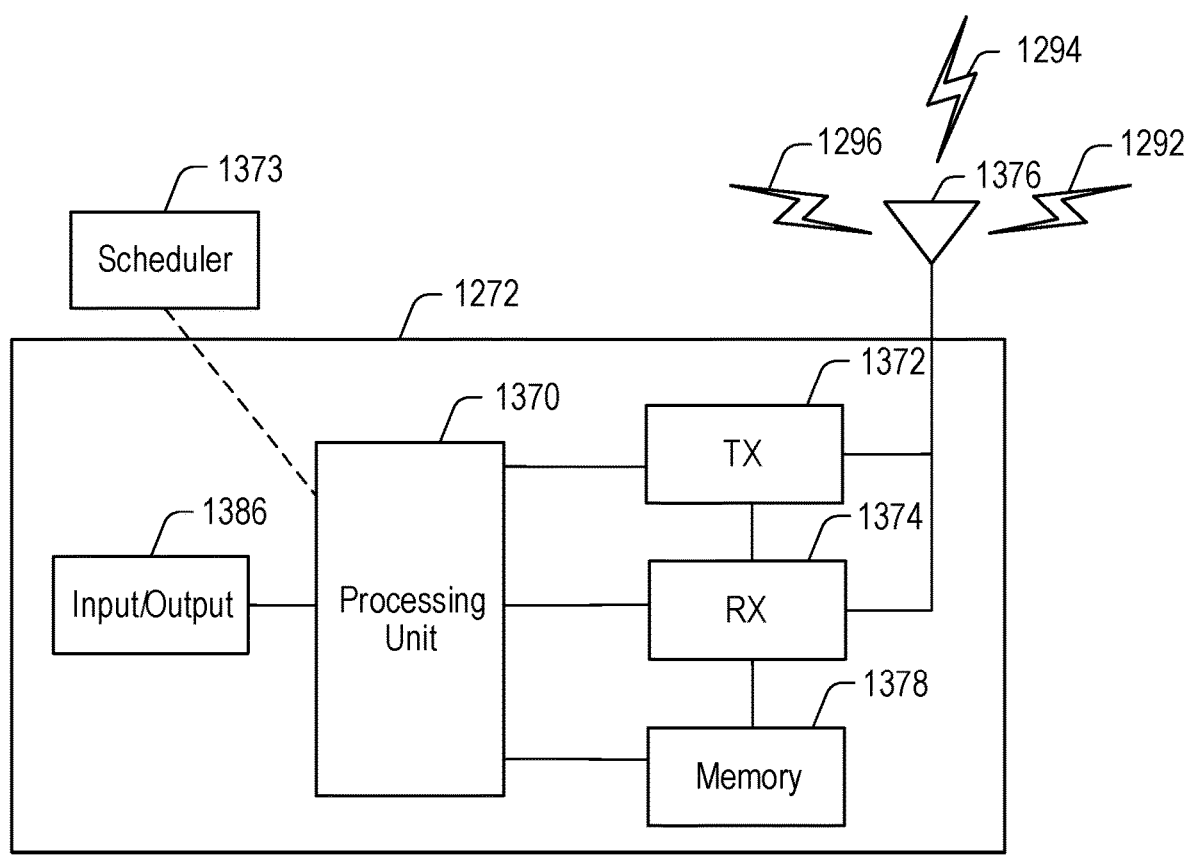

Embodiments are described by way of example above primarily in the context of methods or procedures. Other embodiments, such as apparatus embodiments, are also possible. FIGS. 13A, 13B, and 13C illustrate example devices that may implement features according to this disclosure.

In particular, with reference also to FIG. 12, FIG. 13A illustrates an example ED 1210a-d, FIG. 13B illustrates an example terrestrial TRP 1270a-b, and FIG. 13C illustrates an example non-terrestrial TRP 1272a-b. These components could be used in the communication system 1200 or in any other integrated wireless communication network.

As shown in FIG. 13A, the ED 1210 includes at least one processor or processing unit 1300. The processing unit 1300 implements various processing operations of the ED 1210. For example, the processing unit 1300 could perform signal coding, bit scrambling, data processing, power control, input/output processing, or any other functionality enabling the ED 1210 to operate in a communication network or system. The processing unit 1300 may also be configured to implement some or all of the functionality and/or embodiments described in more detail herein. Each processing unit 1300 includes any suitable processing or computing device configured to perform one or more operations. Each processing unit 1300 could, for example, include a microprocessor, microcontroller, digital signal processor, field programmable gate array, or application specific integrated circuit.

The ED 1210 also includes at least one transceiver 1302. The transceiver 1302 is configured to modulate data or other content for transmission by at least one antenna or Network Interface Controller (NIC) 1304. The transceiver 1302 is also configured to demodulate data or other content received by the at least one antenna 1304. The transceiver 1302 includes any suitable structure for generating signals for wireless transmission and/or processing signals received wirelessly. Each antenna 1304 includes any suitable structure for transmitting and/or receiving wireless signals. One or multiple transceivers 1302 could be used in the ED 1210. One or multiple antennas 1304 could be used in the ED 1210. Although shown as a single functional unit, a transceiver 1302 could also be implemented using at least one transmitter and at least one separate receiver.

The ED 1210 further includes one or more input/output devices 1306 or interfaces. The input/output devices 1306 permit interaction with a user or other devices in the network. Each input/output device 1306 includes any suitable structure for providing information to or receiving information from a user, such as a speaker, microphone, keypad, keyboard, display, or touch screen, including network interface communications.

In addition, the ED 1210 includes at least one memory 1308. The memory 1308 stores instructions and data used, generated, or collected by the ED 1210. For example, the memory 1308 could store software instructions or modules configured to implement some or all of the functionality and/or embodiments described herein and that are executed by the processing unit(s) 1300. Each memory 1308 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 13B, the terrestrial TRP 1270 includes at least one processing unit 1350, at least one transmitter 1352, at least one receiver 1354, one or more antennas 1356, at least one memory 1358, and one or more input/output devices or interfaces 1366. In some implementations, the terrestrial TRP 1270 is a base station. A transceiver, not shown, may be used instead of the transmitter 1352 and receiver 1354. A scheduler 1353 may be coupled to the processing unit 1350. The scheduler 1353 may be included within or operated separately from the terrestrial TRP 1270. The processing unit 1350 implements various processing operations of the terrestrial TRP 1270, such as signal coding, bit scrambling, data processing, power control, input/output processing, or any other functionality. The processing unit 1350 can also be configured to implement some or all of the functionality and/or embodiments described in more detail elsewhere herein. Each processing unit 1350 includes any suitable processing or computing device configured to perform one or more operations. Each processing unit 1350 could, for example, include a microprocessor, microcontroller, digital signal processor, field programmable gate array, or application specific integrated circuit.

Each transmitter 1352 includes any suitable structure for generating signals for wireless transmission to one or more EDs or other devices. Each receiver 1354 includes any suitable structure for processing signals received wirelessly from one or more EDs or other devices. Although shown as separate components, at least one transmitter 1352 and at least one receiver 1354 could be combined into a transceiver. Each antenna 1356 includes any suitable structure for transmitting and/or receiving wireless signals via the wireless links 1290, 1296. Although a common antenna 1356 is shown here as being coupled to both the transmitter 1352 and the receiver 1354, one or more antennas 1356 could be coupled to the transmitter(s) 1352, and one or more separate antennas 1356 could be coupled to the receiver(s) 1354. Each memory 1358 includes any suitable volatile and/or non-volatile storage and retrieval device(s) such as those described above in connection to the ED 1210. The memory 1358 stores instructions and data used, generated, or collected by the terrestrial TRP 1270. For example, the memory 1358 could store software instructions or modules configured to implement some or all of the functionality and/or embodiments described above and that are executed by the processing unit(s) 1350.

Each input/output device 1366 permits interaction with a user or other devices in the network. Each input/output device 1366 includes any suitable structure for providing information to or receiving/providing information from a user, including network interface communications.

Referring now to FIG. 13C, the non-terrestrial TRP 1272 includes at least one processing unit 1370, at least one transmitter 1372, at least one receiver 1374, one or more antennas 1376, at least one memory 1378, and one or more input/output devices or interfaces 1386. A transceiver, not shown, may be used instead of the transmitter 1372 and receiver 1374. An optional scheduler 1373 may be coupled to the processing unit 1370. The scheduler 1373 may be included within or operated separately from the non-terrestrial TRP 1272. The processing unit 1370 implements various processing operations of the non-terrestrial TRP 1272, such as signal coding, bit scrambling, data processing, power control, input/output processing, or any other functionality. The processing unit 1370 can also be configured to implement some or all of the functionality and/or embodiments described in more detail elsewhere herein. Each processing unit 1370 includes any suitable processing or computing device configured to perform one or more operations. Each processing unit 1370 could, for example, include a microprocessor, microcontroller, digital signal processor, field programmable gate array, or application specific integrated circuit.

Each transmitter 1372 includes any suitable structure for generating signals for wireless transmission to one or more EDs or other devices. Each receiver 1374 includes any suitable structure for processing signals received wirelessly from one or more EDs or other devices. Although shown as separate components, at least one transmitter 1372 and at least one receiver 1374 could be combined into a transceiver. Each antenna 1376 includes any suitable structure for transmitting and/or receiving wireless signals via the wireless links 1292, 1294, 1296. Although a common antenna 1376 is shown here as being coupled to both the transmitter 1372 and the receiver 1374, one or more antennas 1376 could be coupled to the transmitter(s) 1372, and one or more separate antennas 1376 could be coupled to the receiver(s) 1374. Each memory 1378 includes any suitable volatile and/or non-volatile storage and retrieval device(s) such as those described above in connection to the ED 1210. The memory 1378 stores instructions and data used, generated, or collected by the non-terrestrial TRP 1272. For example, the memory 1378 could store software instructions or modules configured to implement some or all of the functionality and/or embodiments described above and that are executed by the processing unit(s) 1370.

Each input/output device 1386 permits interaction with a user or other devices in the network. Each input/output device 1386 includes any suitable structure for providing information to or receiving/providing information from a user, including network interface communications.

It should be appreciated that one or more embodiments disclosed herein, including method embodiments or apparatus embodiments, may be implemented by corresponding units or modules. For example, a signal may be transmitted by a transmitting unit or a transmitting module. A signal may be received by a receiving unit or a receiving module. A signal may be processed by a processing unit or a processing module. Other features may be performed by these or other modules. The respective units or modules may be implemented using hardware, components that execute software, or a combination thereof. For instance, one or more of the units or modules may be or include one or more integrated circuits, such as field programmable gate arrays (FPGAs) or application-specific integrated circuits (ASICs). It will be appreciated that where the modules are implemented using software, they may be retrieved by a processor, in whole or part as needed, individually or together for processing, in single or multiple instances, and that the modules themselves may include instructions for further deployment and instantiation.

In general, hardware, firmware, components which execute software, or some combination thereof could be used in implementing features disclosed herein. Electronic devices that might be suitable for implementing any or all of these components include, among others, microprocessors, microcontrollers, Programmable Logic Devices (PLDs), Field Programmable Gate Arrays (FPGAs), Application Specific Integrated Circuits (ASICs), and other types of "intelligent" integrated circuits.

Any of various types of memory devices could be implemented. For example, any of the memory 1308, the memory 1358, and the memory 1378 could include one or more physical memory devices. Solid-state memory devices such as a Flash memory device could be implemented. Memory devices with movable or even removable storage media could also or instead be implemented.

FIG. 13A illustrates an example of a UE, and FIGS. 13B and 13C illustrate examples network devices, in which embodiments could be implemented. More generally, an apparatus may include a processor and a non-transitory computer readable storage medium, such as the processing unit 1300, 1350, 1370 and memory 1308, 1358, 1378. Such an apparatus may be a UE. Another example of an apparatus is network equipment, which may be a gNB, a TRP, a base station, or any other type of network device or equipment referenced herein. Other components, such as a communication interface to which the processor is coupled, may also be provided. Elements 1302, 1304, 1352, 1354, 1356, 1372, 1374, 1376 are examples of communication interfaces that may be provided in some embodiments.

In an embodiment, the storage medium stores programming for execution by the processor, and the programming includes instructions to perform a method as disclosed herein. For example, the instructions, when executed by a processor, may cause the processor to perform any of various operations.

Another embodiment relates to a computer program product that includes a non-transitory computer readable storage medium storing programming. The programming includes instructions to perform a method as disclosed herein.

In some embodiments, the programming includes instructions to, or to cause a processor to, communicate signaling indicative of information for application by a UE in selection between multiple cooperation nodes to provide the UE with access to a non-terrestrial network device in an integrated wireless communication network. For a UE, the programming may include instructions to receive signaling indicative of information for application by the UE in selection between multiple cooperation nodes to provide the UE with access to a non-terrestrial network device in an integrated wireless communication network, and to select between the multiple cooperation nodes based on the information. For a cooperation node for an integrated wireless communication network, the programming may include instructions to transmit to a UE signaling that is indicative of information for application by the UE in selection between multiple cooperation nodes, including the cooperation node, to provide the UE with access to a non-terrestrial network device in the integrated wireless communication network.

Some embodiments include any one or more of the following features, described by way of example elsewhere herein, in any of various combinations:

- the information is or includes network assistance information determined by a network device in the integrated wireless communication network;
- the information is or includes capability information indicative of capabilities of one of the cooperation nodes;
- the information is or includes capability information and further includes a parameter determined by the one of the cooperation nodes;
- the information is or includes a parameter determined by one of the cooperation nodes;
- the multiple cooperation nodes are determined by the network device, and the programming includes instructions to communicate the signaling by transmitting the signaling by the network device to the multiple cooperation nodes;

the programming further includes instructions to transmit further signaling, indicative of a constraint on cooperation nodes to provide the UE with access to a non-terrestrial network device in the integrated wireless communication network, by the network device to a candidate cooperation node for application of the constraint by the candidate cooperation node in determining whether the candidate cooperation node may be one of the multiple cooperation nodes;

the programming further includes instructions to receive, by a cooperation node from a network device in the integrated wireless communication network, further signaling to indicate that the cooperation node is one of the multiple cooperation nodes;

the programming includes instructions to communicate the signaling indicative of the information by transmitting, from the cooperation node to the UE, the signaling after receiving the further signaling from the network device;

the programming further includes instructions to receive by a cooperation node from a network device in the integrated wireless communication network, further signaling indicative of a constraint on cooperation nodes to provide the UE with access to a non-terrestrial network device in the wireless communication network;

the programming includes instructions to communicate the signaling by transmitting the signaling indicative of the information, by the cooperation node to the UE if the cooperation node satisfies the constraint;

the programming includes instructions to communicate the signaling by receiving the signaling at the UE;

the programming further includes instructions to transmit further signaling, by the UE, to a selected cooperation node of the multiple cooperation nodes that is selected by the UE for access to the non-terrestrial network device based on the information.

Other features that could be implemented in apparatus embodiments or in non-transitory computer readable storage medium embodiments could be or become apparent, for example, from the method embodiments disclosed herein.

In handover embodiments, for example, programming may include instructions to communicate signaling indicative of information for application in determining, by a first cooperation node that is part of a cooperation group in which the first cooperation node and a second cooperation node have respective connections to a first network device in an integrated wireless communication network, whether: the first cooperation node is to perform a handover procedure to establish a connection to a second network device in the integrated wireless communication network while the second cooperation node maintains its connection to the first network device, at least one of the first network device and the second network device comprising a non-terrestrial network device; or the second cooperation node is to perform a handover procedure to establish a connection to the second network device while the first cooperation node maintains its connection to the first network device.

Some embodiments include any one or more of the following features, described by way of example elsewhere herein, in any of various combinations:

the programming includes instructions to communicate the signaling by receiving the signaling, by the first cooperation node from the second cooperation node, indicative of a connection quality associated with a connection between the second cooperation node and the second network device;

the programming further includes instructions to perform, by the first cooperation node, the handover procedure responsive to determining that a connection quality associated with a connection between the first cooperation node and the second network device is better than the connection quality associated with the connection between the second cooperation node and the second network device;

the programming further includes instructions to maintain, by the first cooperation node, cooperation-enabled access to the first network device through the second cooperation node where the first cooperation node performs the handover procedure;

the programming further includes instructions to maintain, by the first cooperation node, the connection to the first network device responsive to determining that the connection quality associated with the connection between the second cooperation node and the second network device is better than a connection quality associated with a connection between the first cooperation node and the second network device;

the programming includes instructions to communicate the signaling by transmitting the signaling, by the first cooperation node to the second cooperation node, indicative of a connection quality associated with a connection between the first cooperation node and the second network device;

the programming further includes instructions to transmit further signaling, by the first cooperation node to the second cooperation node, indicative of a determination made by the first cooperation node as to whether the first cooperation node or the second cooperation node is to perform the handover procedure;

the programming includes instructions to communicate the signaling by receiving the signaling, by the first cooperation node from the second cooperation node, wherein the information is indicative of a determination made by the second cooperation node as to whether the first cooperation node or the second cooperation node is to perform the handover procedure.

Features disclosed in the context of any embodiment are not necessarily exclusive to that particular embodiment, and may also or instead be applied to other embodiments.

What has been described is merely illustrative of the application of principles of embodiments of the present disclosure. Other arrangements and methods can be implemented by those skilled in the art.

For example, although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment could be combined with selected features of other example embodiments.

For example, cooperation is not necessarily limited to out of coverage TUEs, and could also or instead be applied to alleviating beam edge issues. In some embodiments, it may be possible to enhance BWE by providing cooperation-enabled access to UEs that are in-coverage but are located at a beam edge or another location with limited or reduced link quality.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

Although aspects of the present invention have been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although embodiments and potential advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

In addition, although described primarily in the context of methods and apparatus, other implementations are also contemplated, as instructions stored on a non-transitory computer-readable medium, for example. Such media could store programming or instructions to perform any of various methods consistent with the present disclosure.

Moreover, any module, component, or device exemplified herein that executes instructions may include or otherwise have access to a non-transitory computer readable or processor readable storage medium or media for storage of information, such as computer readable or processor readable instructions, data structures, program modules, and/or other data. A non-exhaustive list of examples of non-transitory computer readable or processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer readable or processor readable storage media may be part of a device or accessible or connectable thereto. Any application or module herein described may be implemented using instructions that are readable and executable by a computer or processor may be stored or otherwise held by such non-transitory computer readable or processor readable storage media.

What is claimed is:

1. A method performed by a User Equipment (UE) in an integrated wireless communication network that comprises terrestrial and non-terrestrial network devices, the method comprising:
   receiving signaling indicative of information for application by the UE in selection between multiple cooperation nodes to provide the UE with cooperation-enabled access to a non-terrestrial network device in the integrated wireless communication network through the cooperation nodes; and
   selecting between the multiple cooperation nodes based on the information.

2. The method of claim 1, wherein the information comprises network assistance information determined by a network device in the integrated wireless communication network.

3. The method of claim 2, wherein the network assistance information comprises any one or more of: number of hops to an anchor point, delay to an anchor point, involved subsystems of the integrated wireless communication network, and priority for each of the involved subsystems.

4. The method of claim 1, wherein the information comprises capability information indicative of capabilities of one of the cooperation nodes.

5. The method of claim 4, wherein the capabilities include any one or more of: multi-connectivity, antenna configuration, position-awareness, ability to connect to non-terrestrial network devices, full-duplex connectivity, and supported frequencies.

6. The method of claim 4, wherein the information further comprises a parameter determined by the one of the cooperation nodes.

7. The method of claim 1, wherein the information comprises a parameter determined by one of the cooperation nodes.

8. The method of claim 1, further comprising:
   transmitting further signaling, by the UE, to a selected cooperation node of the multiple cooperation nodes that is selected by the UE for access to the non-terrestrial network device based on the information.

9. A User Equipment (UE) comprising:
   a communication interface;
   a processor coupled to the communication interface;
   a non-transitory computer readable storage medium, coupled to the processor, storing programming for execution by the processor, the programming including instructions to receive signaling indicative of information for application by the UE in selection between multiple cooperation nodes to provide the UE with cooperation-enabled access to a non-terrestrial network device in an integrated wireless communication network through the cooperation nodes, and to select between the multiple cooperation nodes based on the information.

10. The UE of claim 9, wherein the information comprises network assistance information determined by a network device in the integrated wireless communication network.

11. The UE of claim 9, wherein the information comprises capability information indicative of capabilities of one of the cooperation nodes.

12. The UE of claim 11, wherein the information further comprises a parameter determined by the one of the cooperation nodes.

13. The UE of claim 9, wherein the information comprises a parameter determined by one of the cooperation nodes.

14. The UE of claim 9, the programming further including instructions to transmit further signaling to a selected cooperation node of the multiple cooperation nodes that is selected by the UE for access to the non-terrestrial network device based on the information.

15. A cooperation node for an integrated wireless communication network that comprises terrestrial and non-terrestrial network devices, the cooperation node comprising:
- a communication interface;
- a processor, coupled to the communication interface;
- a non-transitory computer readable storage medium, coupled to the processor, storing programming for execution by the processor, the programming including instructions to transmit signaling to a User Equipment (UE), the signaling indicative of information for application by the UE in selection between multiple cooperation nodes, including the cooperation node, to provide the UE with cooperation-enabled access to a non-terrestrial network device in the integrated wireless communication network through the cooperation nodes.

16. The cooperation node of claim 15, wherein the information comprises network assistance information determined by a network device in the integrated wireless communication network.

17. The cooperation node of claim 15, wherein the information comprises capability information indicative of capabilities of the cooperation node.

18. The cooperation node of claim 15, wherein the information comprises a parameter determined by the cooperation node.

19. The cooperation node of claim 15, the programming further including instructions to:
- receive, from a network device in the integrated wireless communication network, further signaling to indicate that the cooperation node is one of the multiple cooperation nodes,
- the programming including instructions to transmit the signaling after receiving the further signaling from the network device.

20. The cooperation node of claim 15, the programming further including instructions to:
- receive, from a network device in the integrated wireless communication network, further signaling indicative of a constraint on cooperation nodes to provide the UE with access to a non-terrestrial network device in the wireless communication network,
- the programming including instructions to transmit the signaling to the UE if the cooperation node satisfies the constraint.

* * * * *